US012745693B2

(12) United States Patent
Smith et al.

(10) Patent No.: US 12,745,693 B2
(45) Date of Patent: Sep. 29, 2026

(54) SUPPLY SYSTEM FOR AGRICULTURAL EQUIPMENT

(71) Applicant: SMITH FOX LLC, Rushville, IN (US)

(72) Inventors: William C. Smith, Rushville, IN (US); Ryan Fox, Rushville, IN (US)

(73) Assignee: SMITH FOX LLC, Rushville, IN (US)

( * ) Notice: Subject to any disclaimer, the term of this patent is extended or adjusted under 35 U.S.C. 154(b) by 59 days.

(21) Appl. No.: 18/826,642

(22) Filed: Sep. 6, 2024

(65) Prior Publication Data

US 2025/0081877 A1 Mar. 13, 2025

Related U.S. Application Data

(60) Provisional application No. 63/537,028, filed on Sep. 7, 2023.

(51) Int. Cl.
*A01C 7/08* (2006.01)
*A01C 7/10* (2006.01)

(52) U.S. Cl.
CPC .............. *A01C 7/082* (2013.01); *A01C 7/084* (2013.01); *A01C 7/102* (2013.01)

(58) Field of Classification Search
CPC ................ B65G 53/48; B65G 2207/06; B65G 2812/16–1683; A01C 7/082; A01C 7/084; A01C 15/04
USPC .............................. 406/56, 57; 111/174, 175
See application file for complete search history.

(56) References Cited

U.S. PATENT DOCUMENTS 2,666,269 A * 1/1954 Parry ........................ F26B 3/08 201/31
2,975,002 A * 3/1961 Thomas .................... F23K 3/00 266/74
4,183,702 A * 1/1980 Bonnel .................. B65G 53/18 406/56
4,443,109 A 4/1984 Watts
4,475,819 A 10/1984 Balmer
4,529,104 A 7/1985 Tyler
4,717,289 A 1/1988 Popowich
4,779,765 A 10/1988 Neumeyer
4,989,784 A * 2/1991 Fairchild ................ A01C 7/084 239/114
5,028,009 A 7/1991 Takata
(Continued)

FOREIGN PATENT DOCUMENTS

| | | |
|---|---|---|
| EP | 3545740 A1 | 10/2019 |
| JP | 3376723 B2 | 2/2003 |

OTHER PUBLICATIONS

International (PCT) Search Report for PCT Application No. PCT/US2024/045548 dated Nov. 15, 2024, SF-101 PCT ||, 22 pages.
(Continued)

*Primary Examiner* — Joseph A Dillon, Jr.

(74) *Attorney, Agent, or Firm* — Barnes & Thornburg LLP

(57) ABSTRACT

A supply system for use with agricultural equipment includes a storage system, a metering system, and a distribution system. The storage system holds dry granules therein. The metering system is configured to meter the dry granules at a determined rate. The distribution system includes a conduit coupled with the manifold to receive the dry granules therefrom and a plurality of outlet tubes in fluid communication with the conduit to direct the dry granules toward a receiver unit at the determined rate.

10 Claims, 11 Drawing Sheets

(56) References Cited

U.S. PATENT DOCUMENTS

| | | | | |
|---|---|---|---|---|
| 5,299,888 | A * | 4/1994 | Wysong | B65G 65/46 406/67 |
| 5,592,889 | A | 1/1997 | Bourgault | |
| 5,634,713 | A * | 6/1997 | Abe | B01F 33/71 406/60 |
| 5,660,506 | A * | 8/1997 | Berge | F25C 5/20 406/33 |
| 5,882,149 | A * | 3/1999 | DeWitt | G01F 1/74 406/56 |
| 6,010,280 | A * | 1/2000 | Svensson | B65G 53/4616 406/67 |
| 7,320,561 | B2 * | 1/2008 | Ambs | B65G 37/00 406/89 |
| 7,743,719 | B2 | 6/2010 | Memory | |
| 7,798,078 | B2 | 9/2010 | Memory | |
| 8,480,336 | B2 * | 7/2013 | Krebs | G01G 13/026 406/60 |
| 8,757,073 | B2 * | 6/2014 | Beaujot | A01C 7/124 111/175 |
| 8,926,231 | B2 * | 1/2015 | Liu | C10J 3/50 406/56 |
| 9,580,256 | B2 | 2/2017 | Wagers | |
| 10,368,480 | B2 * | 8/2019 | Montag | A01C 15/04 |
| 10,568,256 | B2 | 2/2020 | Frasier | |
| 10,569,972 | B2 * | 2/2020 | Montag | A01C 7/06 |
| 10,942,053 | B2 | 3/2021 | Nedved | |
| 11,512,992 | B2 * | 11/2022 | Ruppert | A01C 15/005 |
| 11,528,840 | B2 | 12/2022 | Rosengren | |
| 11,662,240 | B2 * | 5/2023 | Kordick | A01C 19/02 222/71 |
| 11,930,735 | B2 * | 3/2024 | Jagow | A01C 7/084 |
| 12,043,162 | B1 * | 7/2024 | Taylor | B60P 1/60 |
| 12,103,203 | B2 * | 10/2024 | Wilhelm | B02C 23/20 |
| 2003/0133759 | A1 | 7/2003 | Winther | |
| 2004/0156263 | A1 * | 8/2004 | McCann | F25C 5/24 406/60 |
| 2006/0165495 | A1 * | 7/2006 | Krebs | G01G 13/026 406/51 |
| 2007/0278018 | A1 | 12/2007 | Hanaoka | |
| 2011/0179984 | A1 * | 7/2011 | Beaujot | A01C 7/081 406/79 |
| 2013/0202368 | A1 * | 8/2013 | Ehring | B65G 33/22 406/56 |
| 2014/0044602 | A1 * | 2/2014 | Smith | C10B 31/06 406/122 |
| 2015/0289441 | A1 | 10/2015 | Arnett | |
| 2016/0000003 | A1 | 1/2016 | Wendte | |
| 2017/0156259 | A1 * | 6/2017 | Barsi | A01C 7/084 |
| 2021/0206589 | A1 | 7/2021 | Ruppert | |
| 2021/0251141 | A1 | 8/2021 | Dennis | |
| 2024/0164244 | A1 * | 5/2024 | Karlsson | A01C 7/084 |
| 2025/0353663 | A1 * | 11/2025 | Holmes | B65G 53/44 |

OTHER PUBLICATIONS

International (PCT) Search Report and Written Opinion for PCT/US2026/017604 dated May 25, 2026, 11 pages.

* cited by examiner

SUPPLY SYSTEM FOR AGRICULTURAL EQUIPMENT

PRIORITY CLAIM

This application claims priority under 35 U.S.C. § 119 (e) to U.S. Provisional Patent Application No. 63/537,028, filed on Sep. 7, 2023, which is expressly incorporated by reference herein.

BACKGROUND

The present disclosure relates to supply systems, and particularly to supply systems for agricultural equipment. More particularly, the present disclosure relates to dry granule supply systems for agricultural equipment.

SUMMARY

A supply system for use with agricultural equipment in accordance with the present disclosure includes a storage system, a metering system, and a distribution system. In illustrative embodiments, the storage system stores dry granules therein. The metering system receives the dry granules from the storage system and meters the dry granules to the distribution system at a predetermined rate. The metering system includes a canister coupled with the storage system that receives the dry granules therefrom, a manifold coupled with the canister to direct the dry granules away from the canister, and a metering screw arranged in the manifold. The metering screw rotates to selectively control the predetermined rate of the dry granules entering the manifold from the canister.

In illustrative embodiments, the distribution system receives the dry granules at the predetermined rate. The distribution system includes a conduit coupled with the manifold to receive the dry granules therefrom and a plurality of outlet tubes in fluid communication with the conduit to direct the dry granules toward a receiver unit at the predetermined rate.

In illustrative embodiments, the supply system further includes a control system. The control system is configured to adjust the predetermined rate of the dry granules being applied to the distribution system from the metering system.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
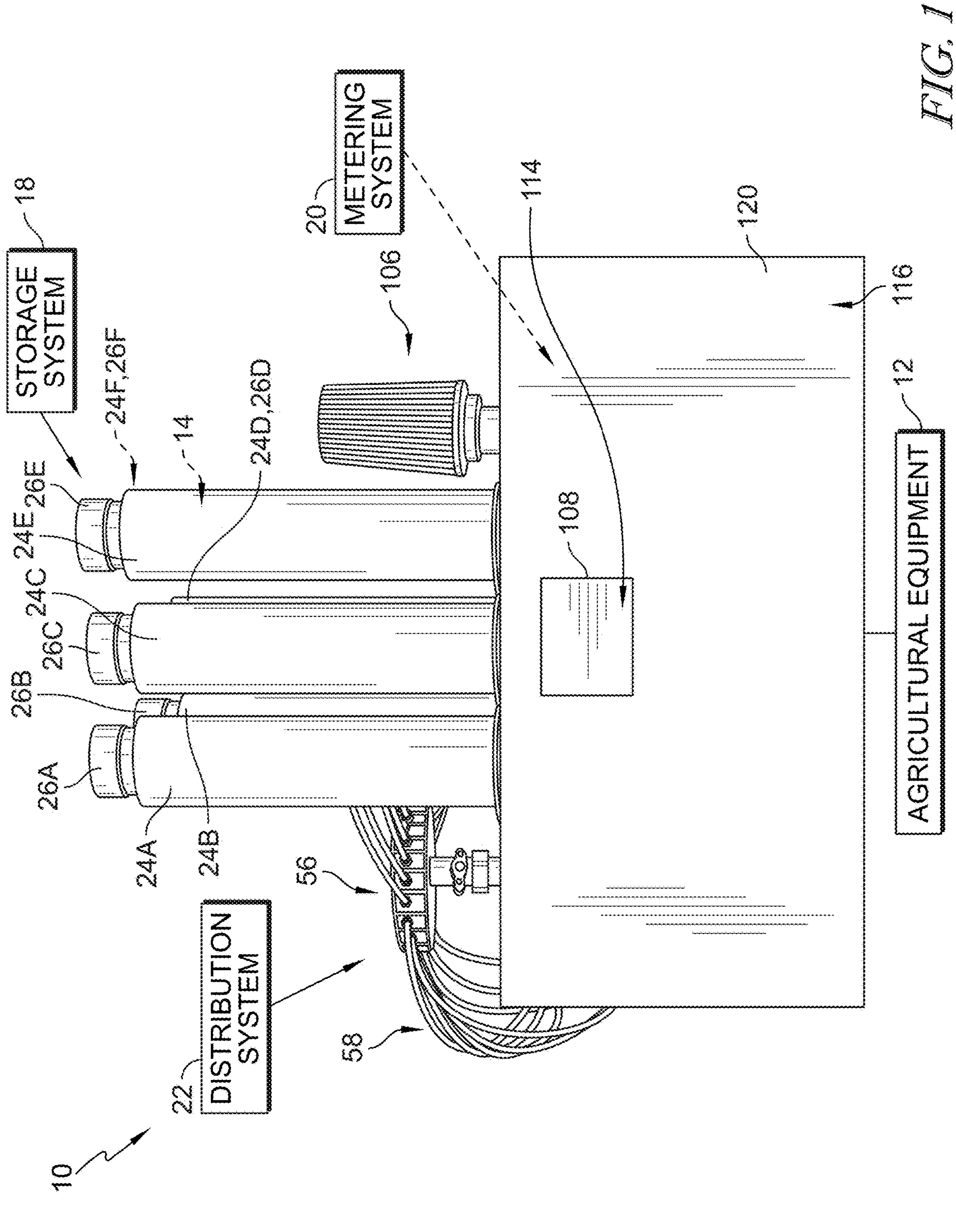
FIG. 1 is a perspective view of a supply system for use with agricultural equipment, the supply system includes a storage system configured to store dry granules therein, a metering system configured to receive the dry granules from the storage system and meter the dry granules at a predetermined rate, a distribution system configured to receive the dry granules from the metering system and apply the dry granules to a receiver unit at the predetermined rate, and a housing configured to hold components of the supply system therein.
Figure 3:
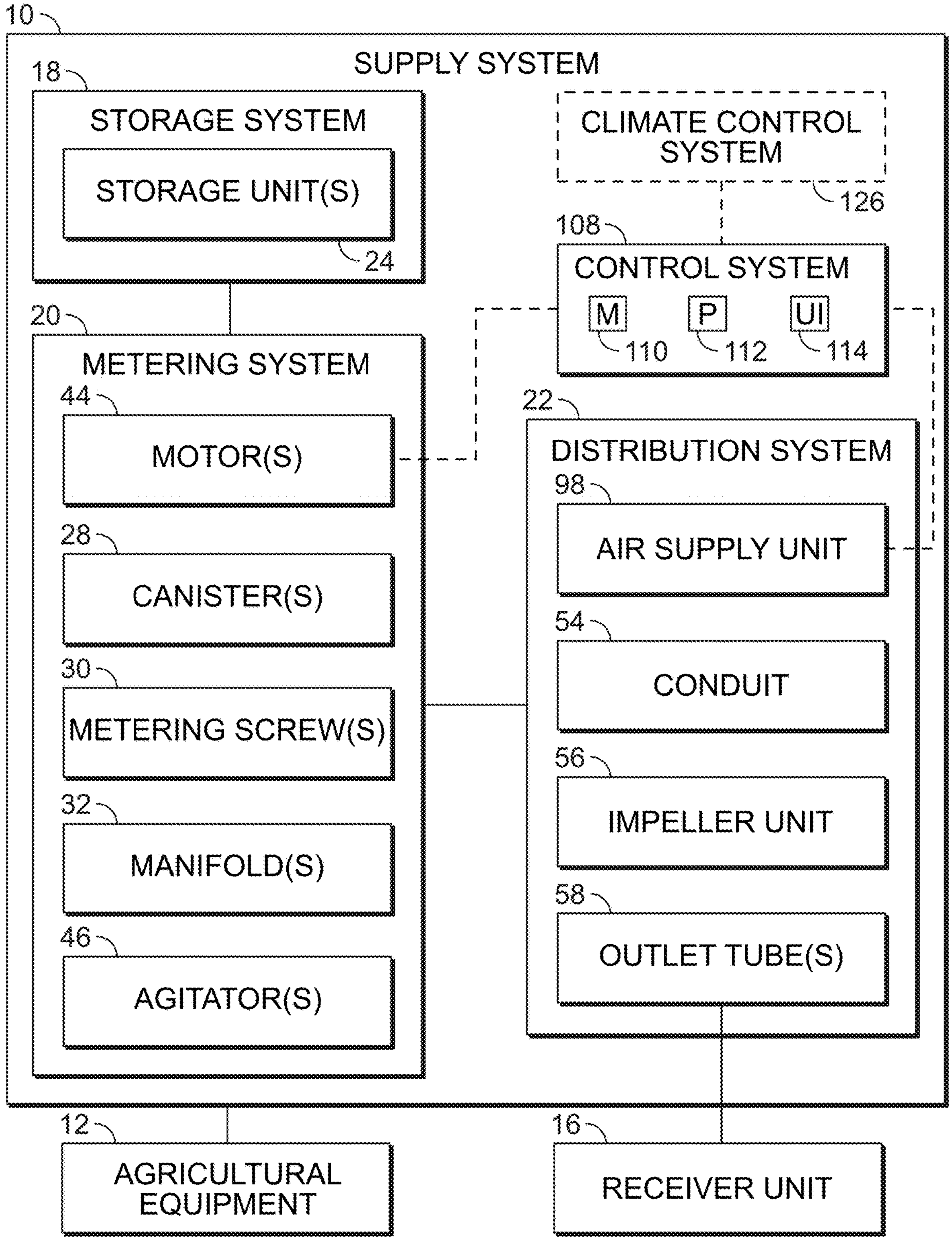
FIG. 3 is a diagrammatic view of the supply system of FIG. 1 showing that the storage system is coupled with the metering system, the metering system is coupled to the distribution system, and a plurality of outlet tubes of the distribution system is coupled to the receiver unit to apply the dry granules thereto at the predetermined rate, and further showing that the supply system includes a control system configured to adjust the predetermined rate of the metering of the dry granules to the distribution system.

The present disclosure relates to dry granule supply systems 10 for agricultural equipment 12, as shown in FIG. 1. The supply system 10 meters dry granules 14 at a predetermined rate so that the dry granules 14 are directed to a receiver unit 16, as shown in FIG. 3, at the predetermined rate. For example, the supply system 10 meters dry granules 14 at the predetermined rate so that the dry granules 14 are directed to a row unit of a planter at the predetermined rate and then implanted into the ground at the predetermined rate. The supply system 10 allows for precise metering of the dry granules 14, thereby minimizing waste and/or overuse of the dry granules 14. In some embodiments, the rate is actively determined while the system 10 is in use. For example, the system 10 may receive and interpret data in real time and simultaneously produce a prescription rate for the dry granules 14.

In one example, comparative supply systems may use liquid forms of products instead of dry forms of products. The liquid forms of products suffer from substantially shorter shelf life such that the liquid forms may not be stored for any appreciable time after being liquefied. For example, liquids cause biologicals to active, which triggers the shelf life of the biologicals. Further, liquid forms of products may solidify and freeze under certain weather conditions, rendering the liquid forms of products unusable. Liquid forms may also be exposed to environmental conditions that hinder their viability potential.

In another example, traditionally, seeds are coated with a liquid via seed coating, seed soaking, or seed spraying. These liquid coatings then solidify around the seed. For the seed to grow, the seed must soak up water, causing the seed to swell and break its outer shell. Once the shell bursts, the germinated seed emerges from the shell and begins to grow. If the seed is coated, the water must penetrate deeper as the water must also penetrate the coating. These liquid coatings, therefore, hinder germination of seeds.

As such, the supply system 10 is provided so that dry granules 14 are applied to the receiver unit 16 at the predetermined rate. Dry granules 14 provide many benefits over liquid forms of products, such as, for example, substantially longer shelf life, the ability to use the dry granules 14 in various weather conditions, and not hindering the germination of the seeds.

The supply system 10 is mounted and/or coupled with the agricultural equipment 12, as shown in FIG. 1. The supply system 10 may be moved from one type of agricultural equipment 12 to another type of agricultural equipment 12. Examples of the agricultural equipment 12 include, but are not limited to, a planter, an aerial drone, an airplane, a seed tender, a combine, among other agricultural equipment 12. In some embodiments, the agricultural equipment 12 is stationary. In some embodiments, the agricultural equipment 12 is non-stationary such that the supply system 10 moves with the agricultural equipment 12 while coupled to the agricultural equipment 12.

The supply system 10 is coupled to the receiver unit 16 so that the receiver unit 16 receives the dry granules 14 therefrom, as shown in FIG. 3. Examples of the receiver unit 16 include, but are not limited to, an air supply line, a seed supply line, a liquid supply line, among other receiver units 16. For example, the receiver unit 16 may include a reservoir or a liquid supply line of a liquid fertilizer system. As another example, the receiver unit 16 may include a row unit of a planter. Another example, the receiver unit 16 may include a seed distribution line of a planter. In some embodiments, the receiver unit 16 is attached to the agricultural equipment 12. In some embodiments, the receiver unit 16 is a part of the agricultural equipment 12.

In some embodiments, the dry granules 14 are delivered with a seed. In some embodiments, the dry granules 14 are delivered without a seed. In some embodiments, the dry granules 14 are delivered with fertilizer. In some embodiments, the dry granules 14 are biological dry granules. In some embodiments, the dry granules 14 are non-biological dry granules. In some embodiments, the dry granules 14 are a mixture of biological and non-biological dry granules. Examples of the dry granules 14 include, but are not limited to, microbes, organic pesticides, carriers, such as a glucose substrate and/or engineered coating/materials, boron, zinc, talc, among other dry granules 14. In some embodiments, the dry granules 14 are used to dose animal feeds.

Figure 2:
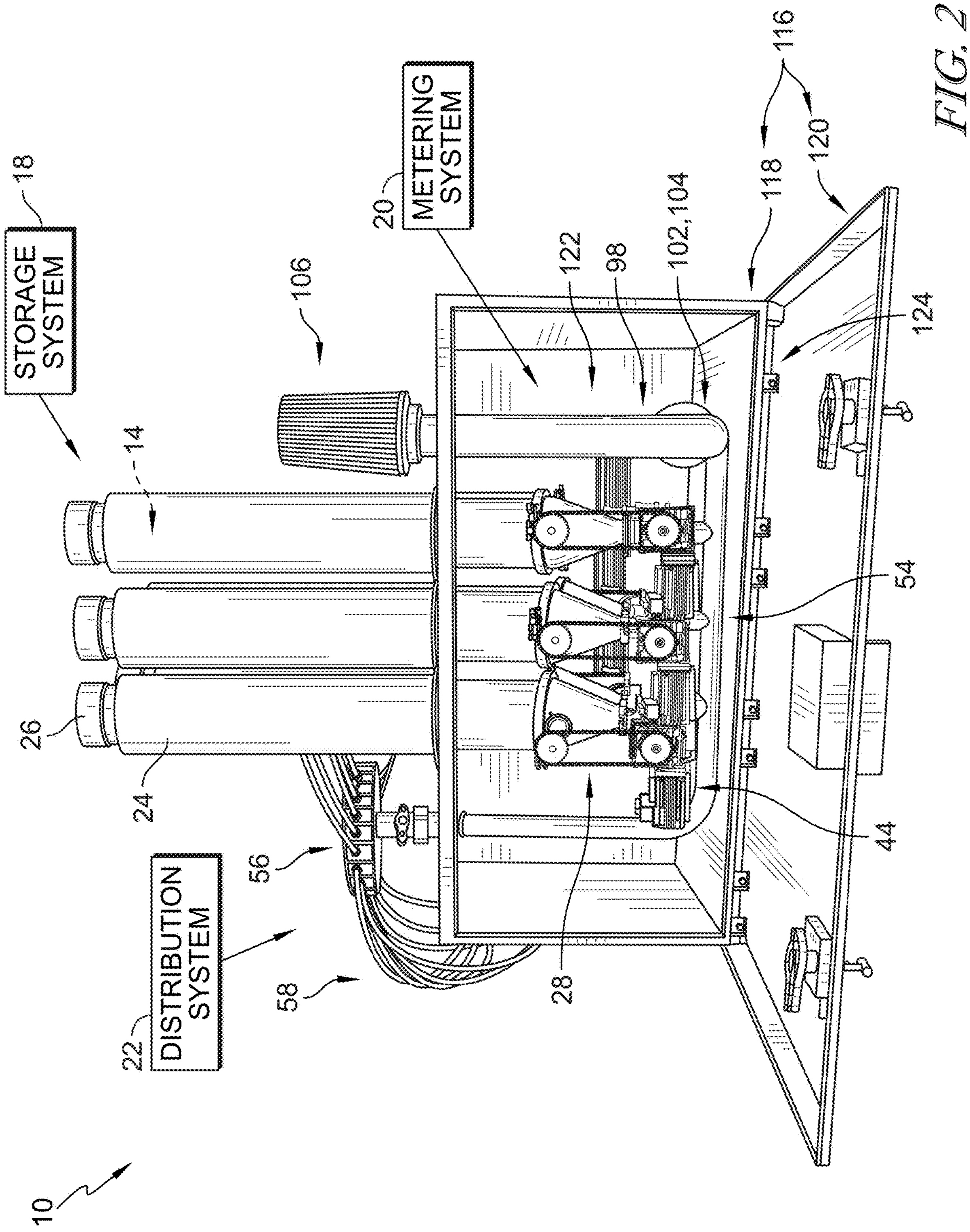
FIG. 2 is a perspective view of the supply system of FIG. 1 with a door of the housing open and showing a plurality of canisters of the metering system arranged within the housing and coupled with the storage system to receive the dry granules therefrom, the plurality of canisters is coupled to a conduit of the distribution system to direct the dry granules thereto at the predetermined rate, and the conduit is coupled to an impeller unit of the distribution system arranged outside of the housing to direct the dry granules to the impeller unit.

The supply system 10 includes a storage system 18, a metering system 20, and a distribution system 22, as shown in FIGS. 1-3. The storage system 18 holds the dry granules 14 therein. The metering system 20 is configured to meter the dry granules 14 at the predetermined rate. The distribution system 22 directs the dry granules 14 from the metering system 20 to the receiver unit 16 at the predetermined rate.

Illustratively, the storage system 18 includes a storage unit 24 and a lid 26, as shown in FIGS. 1 and 2. The storage unit 24 stores the dry granules 14 therein, and the lid 26 is removably coupled with the storage unit 24 to open and close the storage unit 24. The storage unit 24 is refillable after the lid 26 is removed. Illustratively, in some embodiments, the storage unit 24 may be insulated or may be at least partially insulated to protect the dry granules 14 from ambient temperatures.

Figure 4:
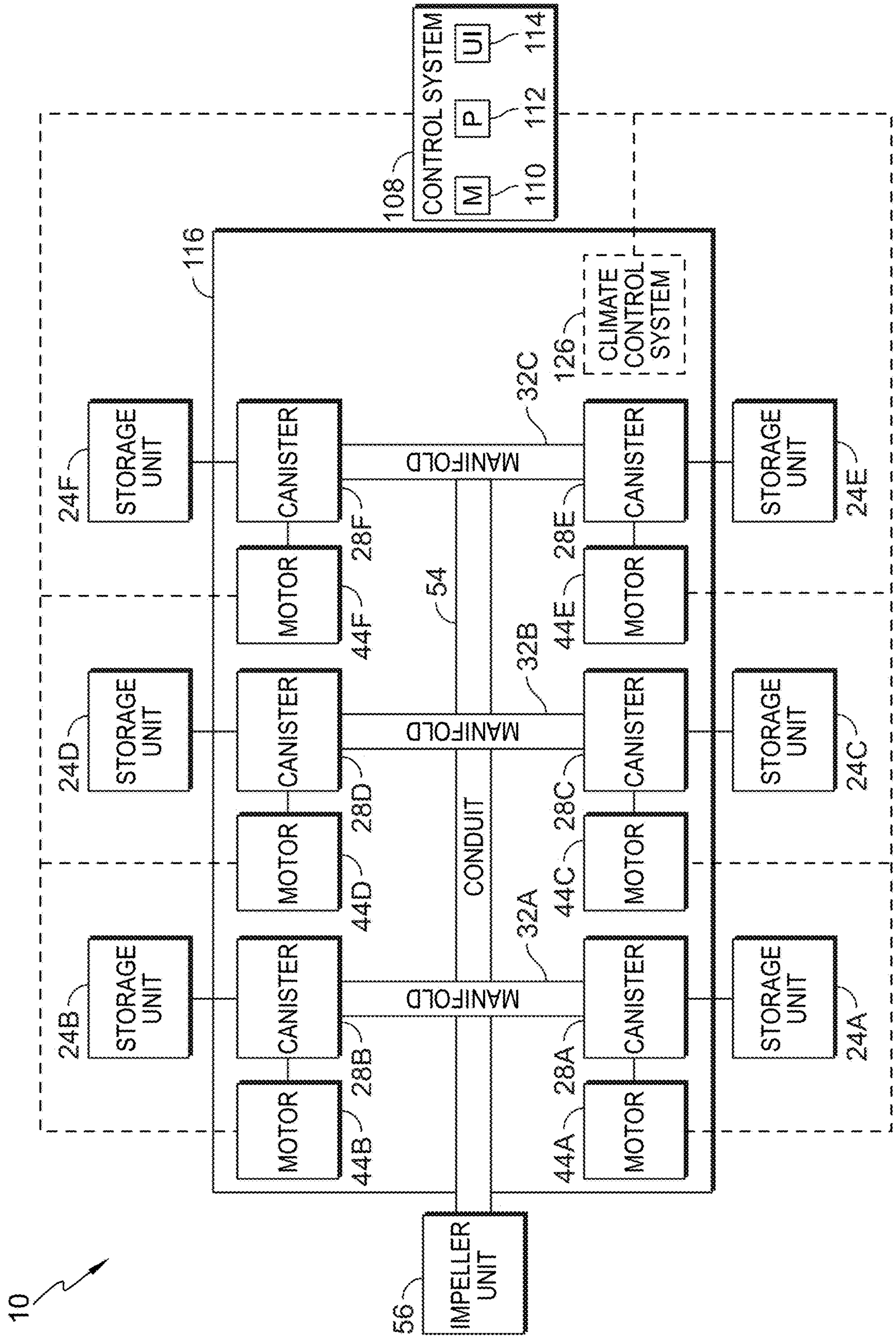
FIG. 4 is another diagrammatic view of the supply system of FIG. 1. showing that each of the plurality of canisters is coupled with a corresponding one of a plurality of motors included in the metering system, and further showing that each of the plurality of canisters is coupled with a corresponding one of a plurality of storage units included in the storage system to receive the dry granules therefrom.

In some embodiments, the storage system 18 includes one storage unit 24 and one lid 26. In some embodiments, the storage system 18 includes a first storage unit 24A, a second storage unit 24B, a first lid 26A, and a second lid 26B. In some embodiments, the storage system 18 includes additional storage units 24 and additional lids 26. For example, the storage system 18 may comprise a range of about one (1) to about twenty (20) storage units 24 and lids 26, including any number comprised therein. As shown in FIGS. 1, 2, and 4, an exemplary storage system 18 includes six storage units 24A, 24B, 24C, 24D, 24E, 24F and six lids 26A, 26B, 26C, 26D, 26E, 26F. Illustratively, each of the storage units 24A, 24B, 24C, 24D, 24E, 24F are identical such that the description of the storage unit 24 applies to each of the storage units 24A, 24B, 24C, 24D, 24E, 24F.

In some embodiments, the storage unit 24 is removable from the system 10. In such an embodiment, the storage unit 24 is removable and replaceable with a different storage unit 24, for example, or removable and replaceable with the same storage unit 24 after refilling, as another example.

In some embodiments, at least two of the storage units 24A, 24B, 24C, 24D, 24E, 24F include a different type of dry granules 14 therein. For example, the first storage unit 24A may include a first type of dry granules 14 therein, and the second storage unit 24B may include a second type of dry granules 14 therein different than the first type of dry granules 14. In some embodiments, each of the storage units 24A, 24B, 24C, 24D, 24E, 24F includes a different type of dry granules 14 therein. In some embodiments, at least two of the storage units 24A, 24B, 24C, 24D, 24E, 24F include the same type of dry granules 14 therein. In such an embodiment, that particular type of dry granules 14 may be used for a longer period of time without requiring refilling of one of the storage units 24A, 24B, 24C, 24D, 24E, 24F.

Figure 5:
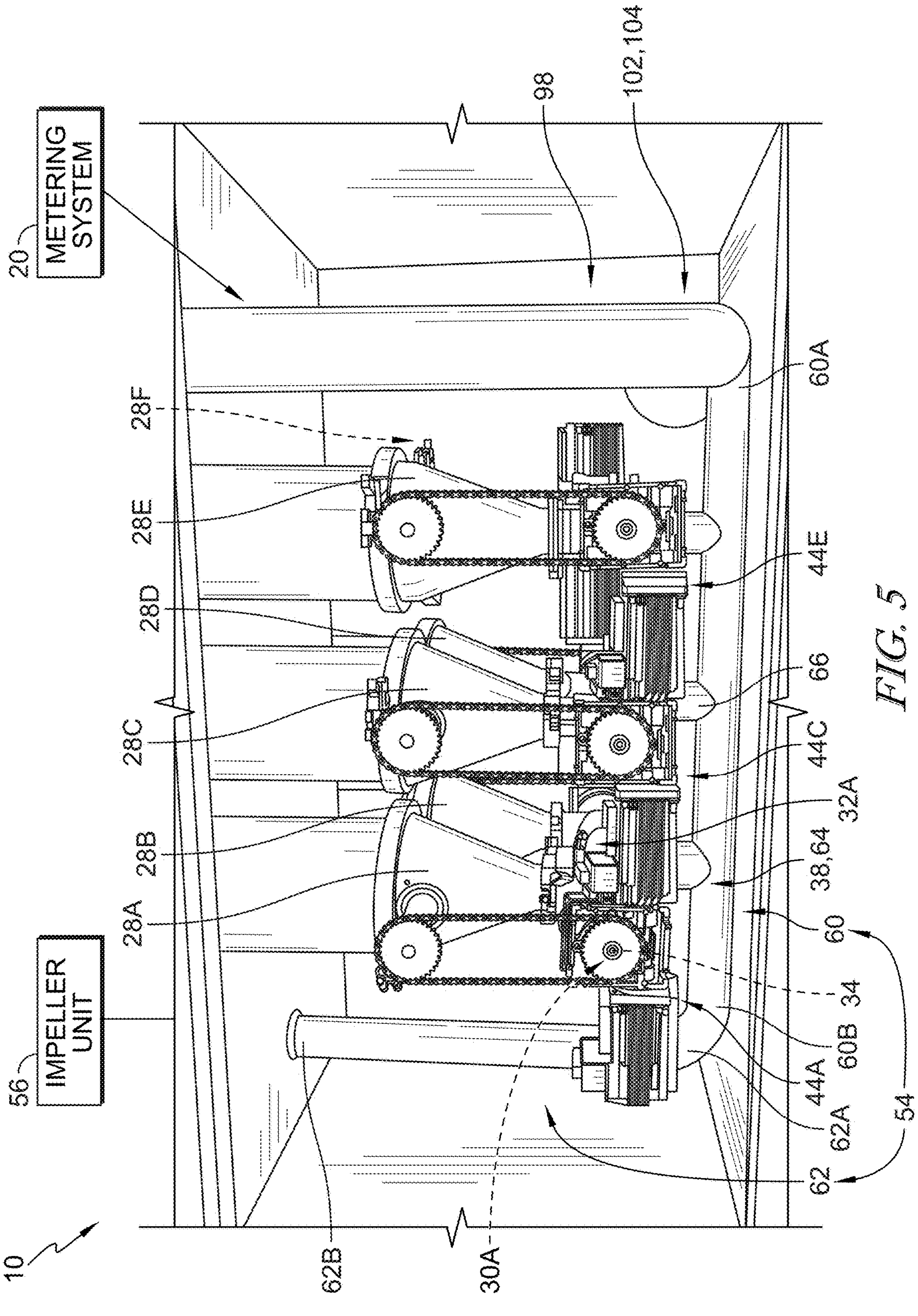
FIG. 5 is an enlarged view of a portion of the supply system of FIG. 2 showing that each of the plurality of canisters is fluidly coupled to a horizontal portion of the conduit of the distribution system and the horizontal portion of the conduit is coupled to an air supply unit to receive pressurized air therefrom so that the dry granules within the horizontal portion of the conduit are directed through the horizontal portion of the conduit, into a vertical portion of the conduit, and to the impeller unit of the distribution system.
Figure 6:
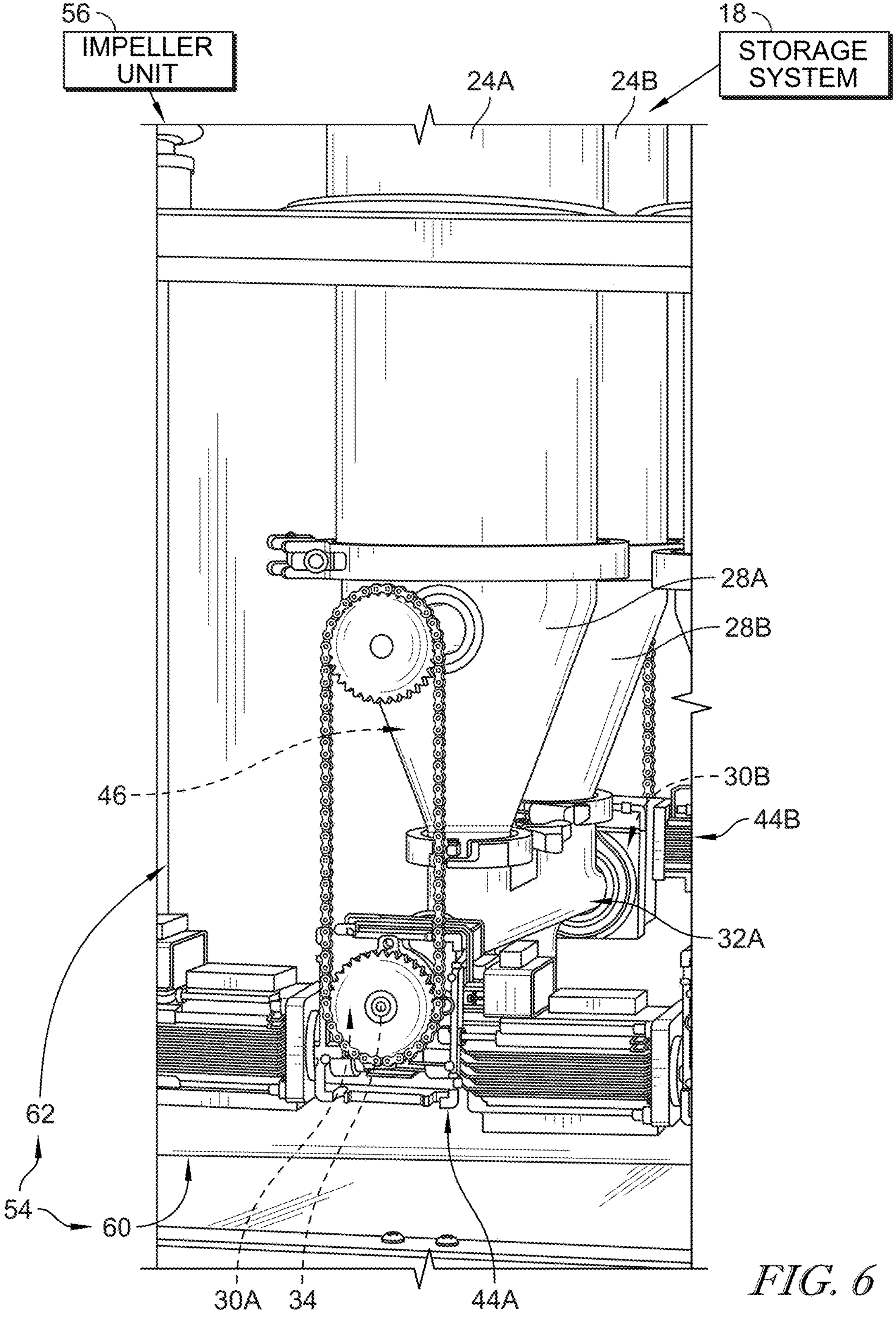
FIG. 6 is an enlarged view of a portion of the supply system of FIG. 5 showing that the metering system includes a plurality of manifolds, and one manifold of the plurality of manifolds is coupled to two canisters of the plurality of canisters, and the manifold is coupled with the horizontal portion of the conduit.
Figure 7:
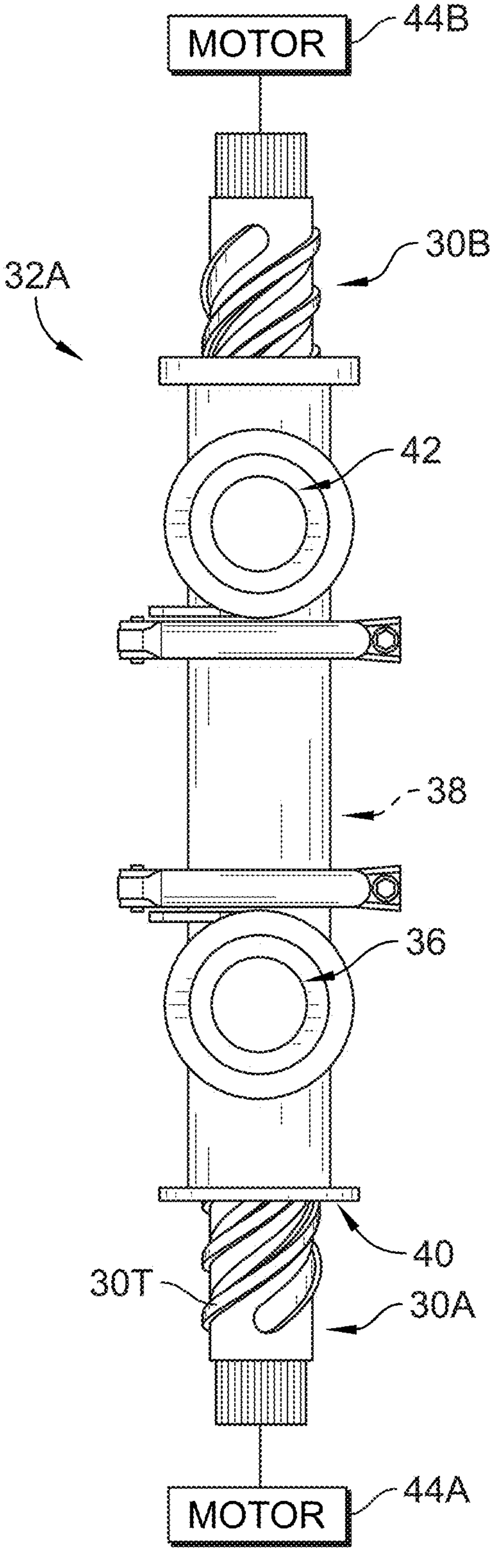
FIG. 7 is a view of the manifold of the metering system of FIG. 6 showing that the manifold includes a first inlet configured to be coupled with a first canister of the plurality of canisters and a second inlet configured to be coupled with a second canister of the plurality of canisters, and further showing that the manifold is formed to include a horizontally-extending hole configured to receive two metering screws of the metering system therein.

The metering system 20 includes a canister 28, a metering screw 30, and a manifold 32, as shown in FIGS. 5 and 6. The canister 28 is coupled with the storage unit 24, as shown in FIG. 6. The metering screw 30 is arranged in the manifold 32, as shown in FIG. 7. The manifold 32 is coupled with the canister 28 to direct the dry granules 14 from the canister 28 to the distribution system 22.

In some embodiments, the canister 28 is funnel shaped with a decreasing diameter as the canister 28 extends from the storage unit 24 to the manifold 32, as shown in FIG. 6. The dry granules 14 pass downwardly from the storage unit 24 to the canister 28.

Figure 8:
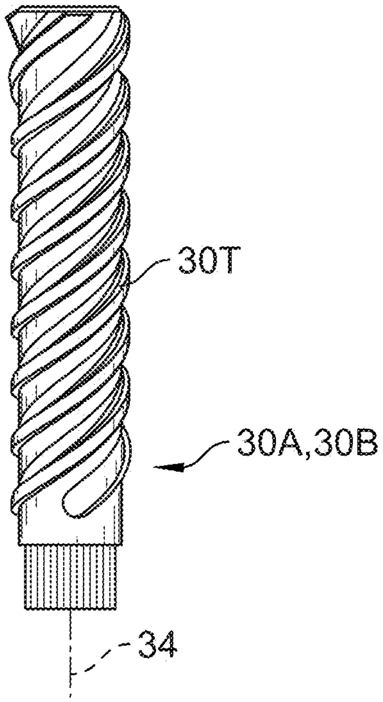
FIG. 8 is a view of one metering screw of the metering system of FIG. 7 showing that the metering screw includes a plurality of threads configured to meter the dry granules from one of the plurality of canisters to the conduit at the predetermined rate as the metering screw rotates about a screw axis within the horizontally-extending hole of the manifold.

The metering screw 30 rotates within the manifold 32 about a screw axis 34 to selectively control the predetermined rate of the dry granules 14 entering the manifold 32 from the canister 28. As shown in FIGS. 7 and 8, the metering screw 30 includes threads 30T. Dry granules 14 rest between neighboring threads 30T and as the metering screw 30 rotates about the screw axis 34, the dry granules 14 are allowed to pass downwardly beyond the metering screw 30.

In some embodiments, the metering system 20 includes one canister 28 and one metering screw 30. In some embodiments, the metering system 20 includes a first canister 28A, a second canister 28B, a first metering screw 30A, and a second metering screw 30B. In some embodiments, the metering system 20 includes additional canisters 28 and additional metering screws 30. For example, the metering system 20 may comprise a range of about one (1) to about twenty (20) canisters 28 and metering screws 30, including any number comprised therein. As shown in FIGS. 2 and 4, an exemplary metering system 20 includes six canisters 28A, 28B, 28C, 28D, 28E, 28F and six metering screws 30A, 30B (two of which are shown). Illustratively, a number of storage units 24 is equal to a number of canisters 28 and a number of metering screws 30. In some embodiments, the number of storage units 24 is not equal to the number of canisters 28 and/or the number of metering screws 30. Illustratively, each of the canisters 28A, 28B, 28C, 28D, 28E, 28F are identical such that the description of the canister 28 applies to the canisters 28A, 28B, 28C, 28D, 28E, 28F, and each of the metering screws 30A, 30B are identical such that the description of the metering screw 30 applies to the metering screws 30A, 30B.

The manifold 32 is arranged below the canister 28 and coupled to the canister 28 to direct the dry granules 14 away from the canister 28 and to the distribution system 22, as shown in FIG. 6. The manifold 32 includes an inlet 36 and an outlet 38. The inlet 36 is coupled with the canister 28, and the outlet 38 is coupled with the distribution system 22. The inlet 36 defines a vertically-extending hole, and the outlet 38 defines a vertically-extending hole. The manifold 32 is formed to include a horizontally-extending hole 40 extending horizontally through the manifold 32 to receive the metering screw 30 therein. The inlet 36 and the outlet 38 open into the horizontally-extending hole 40. The metering screw 30 is located within the horizontally-extending hole 40 of the manifold 32 between the inlet 36 and the outlet 38. The dry granules 14 pass from the inlet 36 to the horizontally-extending hole 40 and then to the outlet 38. The manifold 32 may be formed of steel, polypropylene, or any other suitable material.

Illustratively, in embodiments of the supply system 10 having the first canister 28A, the second canister 28B, the first metering screw 30A, and the second metering screw 30B, the inlet 36 of the manifold 32 is a first inlet 36, and the manifold 32 further includes a second inlet 42, as shown in FIG. 7. The second canister 28B is coupled to the second inlet 42 of the manifold 32. The inlets 36, 42 are horizontally spaced apart from one another and both open into the horizontally-extending hole 40. The first metering screw 30A is located within the horizontally-extending hole 40 of the manifold 32 between the first inlet 36 and the outlet 38, and the second metering screw 30B is located within the horizontally-extending hole 40 of the manifold 32 between the second inlet 42 and the outlet 38. The metering screws 30A, 30B are aligned with one another and both rotate about the same screw axis 34.

The first type of dry granules 14 located in the first storage unit 24A are directed from the first storage unit 24A to the first canister 28A. The first metering screw 30A rotates about the screw axis 34, and the first type of dry granules 14 pass from the first canister 28A, through the first inlet 36 of the manifold 32, and to the outlet 38 of the manifold 32. The second type of dry granules 14 located in the second storage unit 24B are directed from the second storage unit 24B to the second canister 28B. The second metering screw 30B rotates about the screw axis 34, and the second type of dry granules 14 pass from the second canister 28B, through the second inlet 42 of the manifold 32, and to the outlet 38 of the manifold 32. Thus, the first type and the second type of dry granules 14 pass through the same outlet 38 to reach the distribution system 22. The metering screws 30A, 30B may rotate at the same or different rotational speeds to alter the predetermined rate for each type of dry granules 14.

In some embodiments, the metering system 20 includes one manifold 32. In some embodiments, the metering system 20 includes a first manifold 32A, a second manifold 32B, and a third manifold 32C, as shown in FIG. 5. In some embodiments, the metering system 20 includes additional manifolds 32. For example, the metering system 20 may comprise a range of about one (1) to about twenty (20) manifolds 32, including any number comprised therein. As shown in FIGS. 4 and 5, an exemplary metering system 20 includes three manifolds 32A, 32B, 32C. Illustratively, a number of manifolds 32 is equal to half the number of storage units 24, the number of canisters 28, and the number of metering screws 30. In other words, one manifold 32 is included in the supply system 10 for every two storage units 24, two canisters 28, and two metering screws 30. In some embodiments, the number of manifolds 32 is not equal to half the number of storage units 24, the number of canisters 28, and/or the number of metering screws 30. Illustratively, each of the manifolds 32A, 32B, 32C are identical such that the description of the manifold 32 applies to the manifolds 32A, 32B, 32C.

In some embodiments, the metering system 20 further includes a motor 44, as shown in FIGS. 2-4. In illustrative embodiments, the motor 44 is a variable speed motor. The motor 44 is configured to drive rotation of the metering screw 30 about the screw axis 34. The motor 44 drives rotation of the metering screw 30 at different rotational speeds to adjust the predetermined rate of the dry granules 14 passing to the distribution system 22.

In some embodiments, the metering system 20 includes one motor 44. In some embodiments, the metering system 20 includes a first motor 44A and a second motor 44B. In some embodiments, the metering system 20 includes additional motors 44. For example, the metering system 20 may comprise a range of about one (1) to about twenty (20) motors 44, including any number comprised therein. As shown in FIGS. 4 and 5, an exemplary metering system 20 includes six motors 44A, 44B, 44C, 44D, 44E, 44F. Illustratively, a number of motors 44 is equal to the number of storage units 24, the number of canisters 28, and the number of metering screws 30. In some embodiments, the number of motors 44 is not equal to the number of storage units 24, the number of canisters 28, and/or the number of metering screws 30. Illustratively, each of the motors 44A, 44B, 44C, 44D, 44E, 44F are identical such that the description of the motor 44 applies to the motors 44A, 44B, 44C, 44D, 44E, 44F. Because the supply system 10 includes one motor 44 per canister 28 and metering screw 30, each metering screw 30 may rotate at a different rotational speed such that each type of dry granules 14 may be metered to the distribution system 22 at a different predetermined rate. In some embodiments, the metering system 20 may include one motor 44 that drives more than one of the metering screws 30 through direct linear engagement or a combination of transmission drive power transfer devices.

Figure 9:
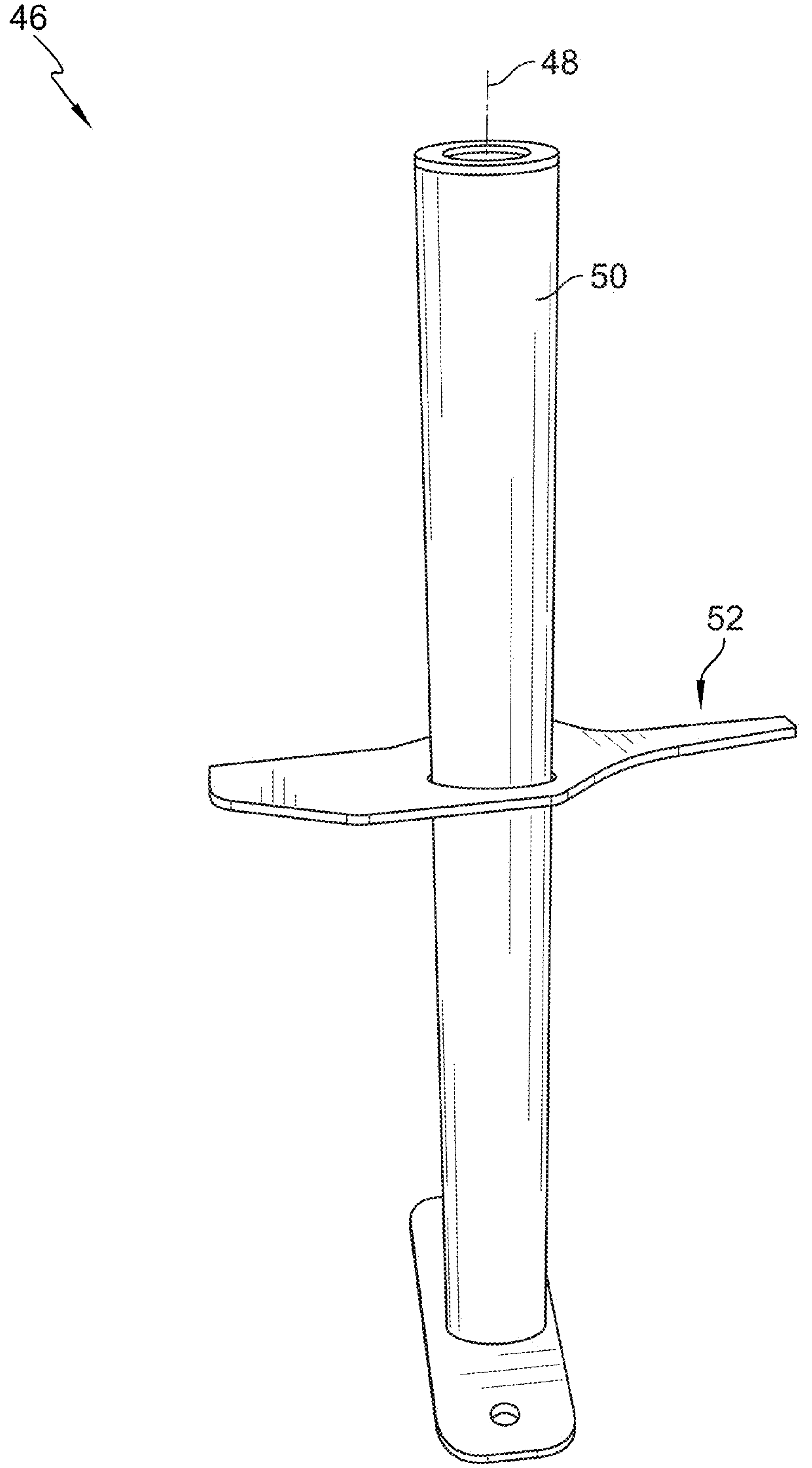
FIG. 9 is a view of one agitator of the metering system of FIG. 2 configured to be arranged in one of the plurality of canisters showing that the agitator includes a shaft and at least two blades extending outwardly away from the shaft, the agitator configured to rotate about an agitator axis to agitate and mix the dry granules within the canister.

In some embodiments, the metering system 20 further includes an agitator 46, as shown in FIG. 9. The agitator 46 is arranged in the canister 28 to rotate about an agitator axis 48. In some embodiments, the agitator axis 48 is perpendicular to the screw axis 34. In other words, the metering screw 30 is horizontally extending and the agitator 46 is vertically extending. In some embodiments, the agitator axis 48 is parallel to the screw axis 34. The agitator 46 is located above or upstream of the inlet 36 of the manifold 32 and the metering screw 30.

The dry granules 14 may be prone to forming a clump and/or a bridge. For example, the dry granules 14 may form a bridge within the canister 28 such that the dry granules 14 do not pass entirely through the canister 28 and into the inlet 36 of the manifold 32. Instead, the dry granules 14 become stuck within the canister 28 in a bridge-like formation. Thus, the agitator 46 mixes and agitates the dry granules 14 within the canister 28 to prevent or minimize the formation of clumps and/or bridges.

The agitator 46 illustratively includes a shaft 50 and at least one plane shaped radial extension 52 extending outwardly away from the shaft 50, as shown in FIG. 9. In some embodiments, the agitator 46 includes two plane shaped radial extensions 52. The plane shaped radial extensions 52 may be referred to as blades 52. As the agitator 46 rotates about the agitator axis 48, the at least two blades 52 move through the dry granules 14 within the canister 28 to agitate and mix the dry granules 14.

In some embodiments, the metering system 20 includes one agitator 46. In some embodiments, the metering system 20 includes a first agitator and a second agitator. In some embodiments, the metering system 20 includes additional agitators 46. For example, the metering system 20 may comprise a range of about one (1) to about twenty (20) agitators 46, including any number comprised therein. An exemplary metering system 20 includes six agitators (only one is shown). Illustratively, a number of agitators 46 is equal to the number of storage units 24, the number of canisters 28, and the number of metering screws 30. In some embodiments, the number of agitators 46 is not equal to the number of storage units 24, the number of canisters 28, and/or the number of metering screws 30. Illustratively, each of the agitators 46 are identical such that the description of the agitator 46 applies to the agitators 46.

Figure 10:
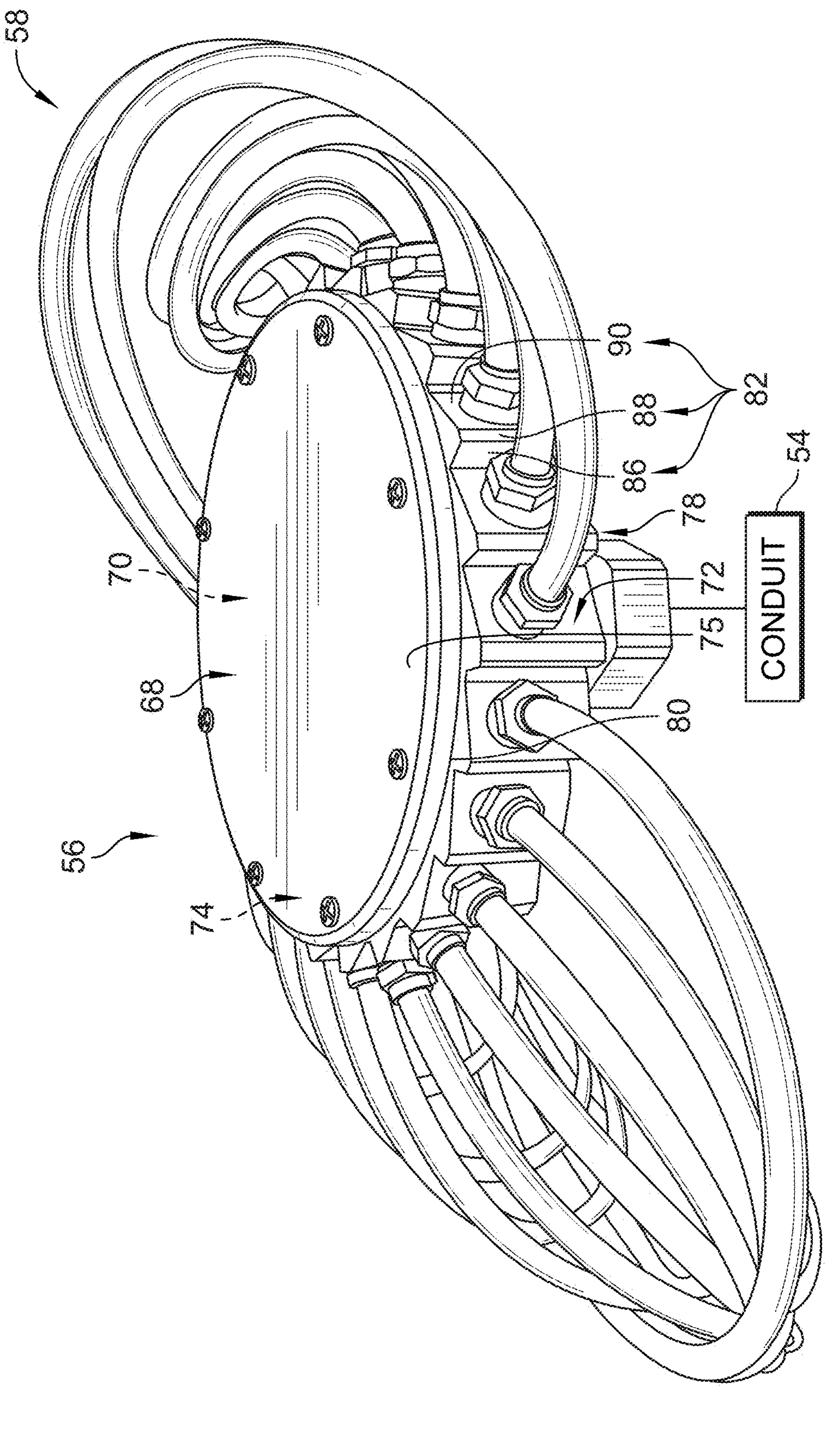
FIG. 10 is an enlarged view of a portion of the distribution system of FIG. 2 showing that the distribution system includes the impeller unit and a plurality of outlet tubes coupled with the impeller unit circumferentially around the impeller unit, the impeller unit including a body that defines an impeller-receiving space therein and an impeller located in the impeller-receiving space of the body and configured to rotate about an impeller axis in response to the pressurized air from the air supply unit to direct the dry granules within the impeller-receiving space into the plurality of outlet tubes.

The distribution system 22 of the supply system 10 includes a conduit 54, an impeller unit 56, and a plurality of outlet tubes 58, as shown in FIGS. 2, 3, and 10. The conduit 54 is coupled to the outlet 38 of the manifold 32 and the impeller unit 56 to direct the dry granules 14 from the manifold 32 to the impeller unit 56. The impeller unit 56 is coupled between the conduit 54 and the plurality of outlet tubes 58 to direct the dry granules 14 into the plurality of outlet tubes 58. The plurality of outlet tubes 58 is coupled with the receiver unit 16, as shown in FIG. 3, to deliver the dry granules 14 thereto.

The conduit 54 includes a horizontal portion 60 that extends between a first end 60A and a second end 60B thereof and a vertical portion 62 that extends between a first end 62A and a second end 62B thereof, as shown in FIG. 5. The horizontal portion 60 is substantially horizontal, and the vertical portion 62 is substantially vertical. The outlet 38 of the manifold 32 is coupled to the horizontal portion 60 between the first end 60A and the second end 60B thereof. The second end 60B of the horizontal portion 60 is coupled to the first end 62A of the vertical portion 62. The second end 62B of the vertical portion 62 is coupled to the impeller unit 56.

In illustrative embodiments, the conduit 54 is formed to include an inlet 64 on the horizontal portion 60 that is coupled with the outlet 38 of the manifold 32. In some embodiments, the inlet 64 is included on a vertically-extending portion 66 of the conduit 54 that extends vertically upwardly away from the horizontal portion 60 to the outlet 38 of the manifold 32.

In embodiments having more than one manifold 32, the manifolds 32A, 32B, 32C are each coupled with the horizontal portion 60 of the conduit 54 horizontally spaced apart from one another, as shown in FIGS. 4 and 5. For example, the first manifold 32A is closest to the vertical portion 62 of the conduit 54 and the third manifold 32C is farthest from the vertical portion 62 of the conduit 54 with the second manifold 32B arranged therebetween. In such an embodiment, the dry granules 14 from each manifold 32A, 32B, 32C enter the horizontal portion 60 of the conduit 54 at different locations along the horizontal portion 60 depending on the location of the manifold 32A, 32B, 32C relative to the vertical portion 62 of the conduit 54.

Figure 13:
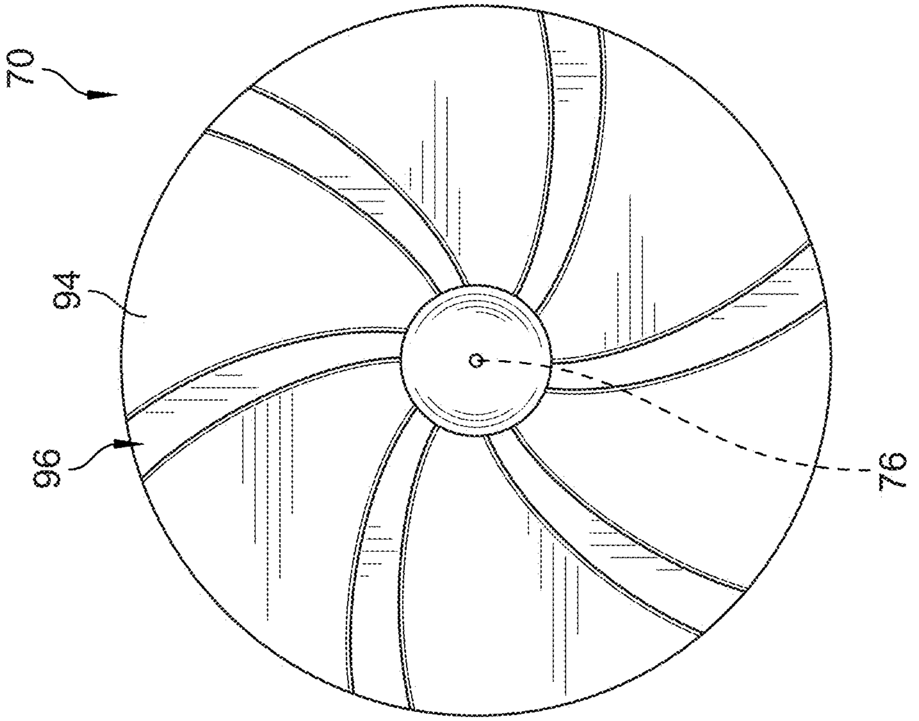
FIG. 13 is a view of the impeller of the impeller unit of FIG. 9 showing that the impeller is formed to include a plurality of blades extending outwardly from a base of the impeller.
Figure 12:
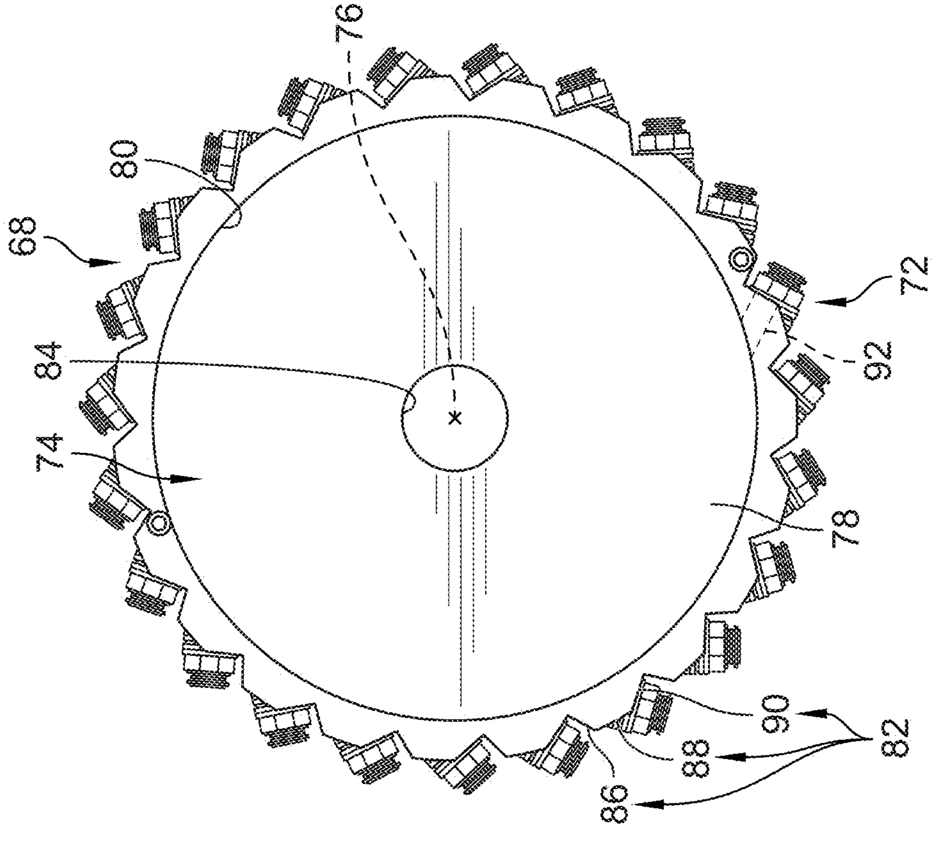
FIG. 12 is a view of the body of the impeller unit of FIG. 9 showing that the body defines the impeller-receiving space therein and further showing that a plurality of nozzles is coupled to the body circumferentially around the body, the plurality of nozzles configured to be coupled with the plurality of outlet tubes.

The impeller unit 56 is coupled with the conduit 54, as shown in FIGS. 2 and 4. The impeller unit 56 includes a body 68, an impeller 70, and a plurality of nozzles 72, as shown in FIGS. 12 and 13. The body 68 defines an impeller-receiving space 74 to receive the impeller 70 therein. The impeller 70 rotates about an impeller axis 76 within the impeller-receiving space 74. The plurality of nozzles 72 is configured to be coupled to the plurality of outlet tubes 58.

The body 68 of the impeller unit 56 is illustratively circular-shaped, as shown in FIG. 12. The body 68 includes a bottom wall 78, a sidewall 80 extending upwardly from the bottom wall 78 away from the conduit 54, and a plurality of platforms 82 extending outwardly away from the sidewall 80. The bottom wall 78 and the sidewall 80 cooperate to form the impeller-receiving space 74. The bottom wall 78 includes a through hole 84, and the conduit 54 is coupled with the bottom wall 78 such that the through hole 84 is fluidly coupled with the conduit 54.

Figure 11:
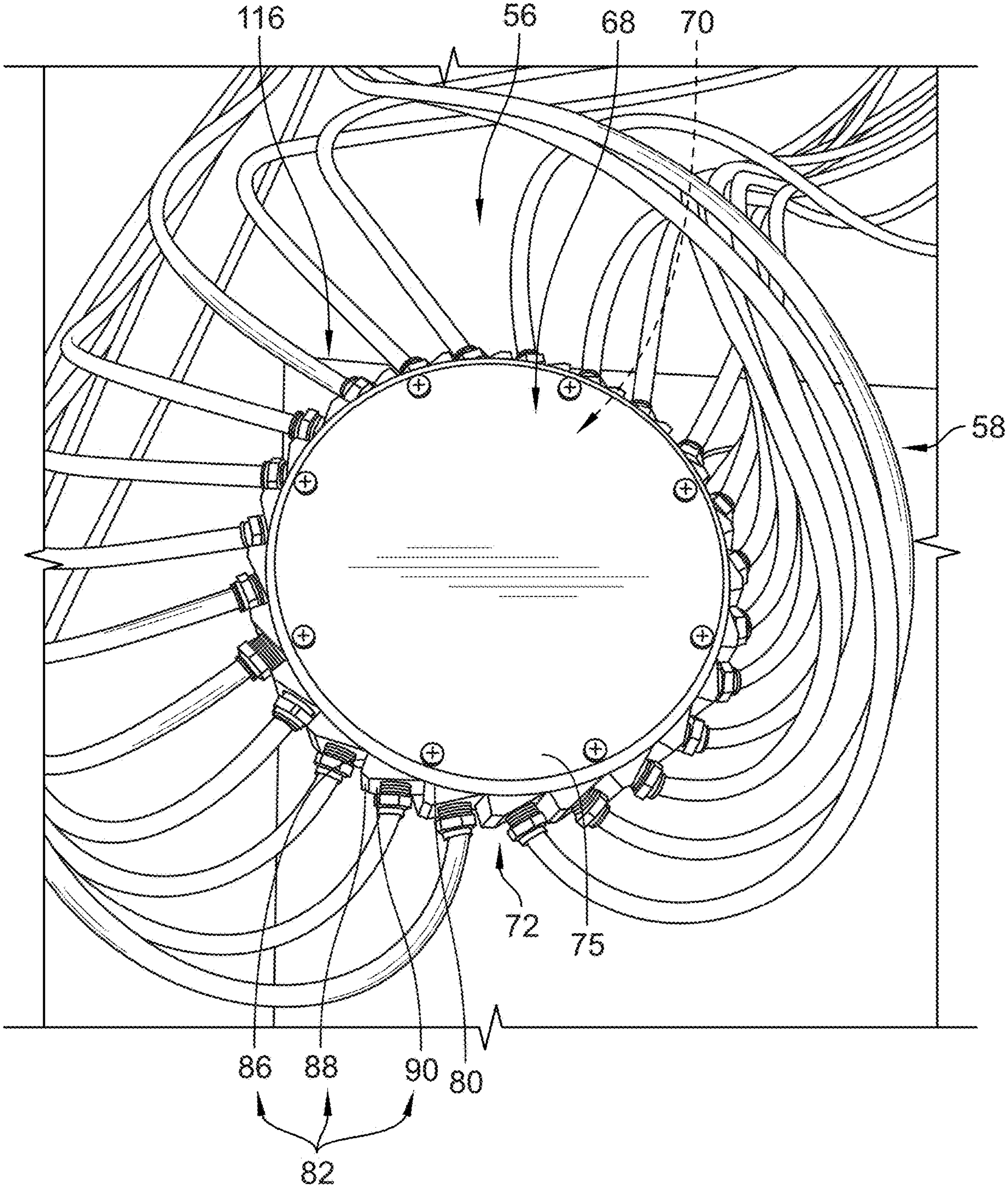
FIG. 11 is a top view of the portion of the distribution system of FIG. 10 showing that each of the plurality of outlet tubes extends outwardly away from the body of the impeller unit an angle.

Each of the plurality of platforms 82 includes a first wall 86, a second wall 88, and a third wall 90, as shown in FIGS. 11 and 12. The first wall 86 extends outwardly away from the sidewall 80. The third wall 90 is spaced apart from the first wall 86 and extends outwardly away from the sidewall 80. The second wall 88 extends between and interconnects the first and third walls 86, 90.

The body 68 of the impeller unit 56 is formed to include a plurality of angled holes 92 extending through the sidewall 80 and the plurality of platforms 82, as shown in FIG. 12. An opening of each of the plurality of angled holes 92 is formed on the third wall 90 of each of the plurality of platforms 82. The intersection of an axis extending through a center point of each of the plurality of angled holes 92 and a plane extending through the impeller axis 76 forms an angle. In some embodiments, the angle ranges from about 10 degrees to about 40 degrees. In illustrative embodiments, the angle is about 20 degrees. In other words, each of the plurality of angled holes 92 extends through the body 68 radially and circumferentially relative to the impeller axis 76 such that each of the plurality of angled holes 92 does not extend straight radially through the body 68.

The impeller 70 is arranged in the impeller-receiving space 74 as suggested in FIGS. 12 and 13. The impeller 70 includes a base 94 and a plurality of blades 96 extending away from the base 94, as shown in FIG. 13. Each of the plurality of blades 96 faces toward the bottom wall 78 of the body 68 while the impeller unit 56 is assembled. Each of the plurality of blades 96 faces downwardly toward the vertical portion 62 of the conduit 54.

The plurality of nozzles 72 is coupled with the plurality of platforms 82 of the body 68, as shown in FIG. 12. The plurality of nozzles 72 is arranged circumferentially about the body 68 relative to the impeller axis 76. Each of the plurality of nozzles 72 aligns with a respective one of the plurality of angled holes 92 so that the plurality of nozzles 72 are similarly angled.

In some embodiments, the impeller unit 56 further includes a top 75, as shown in FIG. 10. The top 75 is coupled with the sidewall 80 of the body 68 to close the impeller-receiving space 74.

Each of the plurality of outlet tubes 58 is coupled with a respective one of the plurality of nozzles 72 circumferentially about the impeller axis 76, as shown in FIG. 11. The plurality of outlet tubes 58 receives the dry granules 14 from the impeller unit 56 and direct the dry granules 14 to the receiver unit 16 at the predetermined rate.

In some embodiments, the distribution system 22 includes at least two outlet tubes 58. In some embodiments, the distribution system 22 includes additional outlet tubes 58. For example, the distribution system 22 may comprise a range of about one (1) to about fifty (50) outlet tubes 58, including any number comprised therein. As shown in FIGS. 10 and 11, an exemplary distribution system 22 includes 24 outlet tubes 58. Due to the angling of the plurality of angled holes 92 and the plurality of nozzles 72, each of the plurality of outlet tubes 58 is similarly angled so that the dry granules 14 travel along the angle to minimize losses in speed and momentum.

In embodiments having the plurality of storage units 24, the dry granules 14 from each storage unit 24 may travel through each of the plurality of outlet tubes 58. In some embodiments, each of the plurality of outlet tubes 58 is split into two tubes farther downstream. In such an embodiment, for example, 24 outlet tubes 58 are coupled to the impeller unit 56, and each outlet tube 58 splits into two tubes farther downstream such that the receiver unit 16 is coupled to 48 tubes.

In some embodiments, the distribution system 22 further includes an air supply unit 98, as shown in FIGS. 2, 3, and 5. The air supply unit 98 is coupled to the first end 60A of the horizontal portion 60 of the conduit 54 to provide pressurized air to the conduit 54. The pressurized air is directed through the horizontal portion 60 of the conduit 54, through the vertical portion 62 of the conduit 54, into the impeller-receiving space 74 of the impeller unit 56, and into the plurality of outlet tubes 58. The pressurized air carries the dry granules 14 through the horizontal portion 60 of the conduit 54, through the vertical portion 62 of the conduit 54, into the impeller-receiving space 74 of the impeller unit 56, and into the plurality of outlet tubes 58. The pressurized air also drives rotation of the impeller 70 about the impeller axis 76. The rotation of the impeller 70 directs the dry granules 14 from the impeller-receiving space 74 and into the plurality of outlet tubes 58 while also creating randomization in which of the plurality of outlet tubes 58 the dry granules 14 are distributed.

In some embodiments, the air supply unit 98 is coupled to the conduit 54 downstream of the outlet 38 of the manifold 32. For example, the air supply unit 98 may be coupled to the second end 60B of the horizontal portion 60 of the conduit 54. In this embodiment, the air supply unit 98 utilizes atmospheric pressure to induce a vacuum within the conduit 54.

In some embodiments, the air supply unit 98 includes a motor 102, a blower 104, and/or a filter 106, as shown in FIGS. 2 and 5. The motor 102 powers the blower 104 so that the blower 104 pressurizes ambient air to provide the pressurized air to the conduit 54. The filter 106 filters the ambient air prior to the ambient air being pressurized by the blower 104.

In some embodiments, the first end 60A of the horizontal portion 60 of the conduit 54 is coupled to an air intake to receive pressurized air. In some embodiments, the first end 60A of the horizontal portion 60 of the conduit 54 receives pressurized air from the agricultural equipment 12.

The supply system 10 further includes a control system 108, as shown in FIGS. 1, 3, and 4. The control system 108 is communicatively coupled with the motor 44 or the motor(s) 44 of the metering system 20. The control system 108 illustratively includes a memory 110, a processor 112, and a user interface 114. The memory 110 stores data therein, for example, the type of dry granules 14 in the canister 28 or the canister(s) 28. The user interface 114 allows an operator to control and/or adjust a rotational speed of the motor 44 or the motor(s) 44, and thus, the rotational speed of the metering screw(s) 30 and the predetermined rate of the dry granules 14 being passed to the conduit 54. In some embodiments, the control system 108 is also communicatively coupled with the air supply unit 98 to turn the motor 102 of the air supply unit 98 on and off.

For example, the operator may set the first motor 44A and the first metering screw 30A to have a first rotational speed so that the first type of dry granules 14 are delivered at a first predetermined rate, while setting the second motor 44B and the second metering screw 30B to have a second rotational speed so that the second type of dry granules 14 are delivered at a second predetermined rate. The second rotational speed may be the same as or different than the first rotational speed, and thus, the first predetermined rate may be the same as or different than the second predetermined rate. In this example, if the first rotational speed is greater than the second rotational speed, then the first predetermined rate is greater than the second predetermined rate such that more of the first type of the dry granules 14 are delivered than the second type of dry granules 14.

The operator and/or the control system 108 may adjust the rotational speeds (and, thus, the mixture of the dry granules 14 being delivered to the receiver unit 16) based on a variety of parameters. The rotational speeds may be adjusted, for example, based on the type of receiver unit 16, whether the dry granules 14 are being implanted with or without a seed, the time of year, the weather, the quality of the soil, among other parameters. In this way, the supply system 10 allows for customized dosing of the dry granules 14 as the agricultural equipment 12 travels through a field, for example.

As an example, the operator and/or the control system 108 may adjust the rotational speeds (and, thus, the mixture of the dry granules 14) based on the quality of soil throughout a field. A first zone in the field may have a first quality of soil, and a second zone in the field, different than the first zone, may have a second quality of soil different than the first quality of soil. For example, the first quality may indicate an abundance of a particular microbe, and the second quality may indicate a lack of the particular microbe. A particular type of dry granules 14, such as the second type of dry granules 14, may be applied to the field to supplement the zones of the field having the lacking microbe.

Thus, while the supply system 10 and the agricultural equipment 12 are in the first zone (having the abundance of the particular microbe), only the first type of dry granules 14 are applied to the field. The second type of dry granules 14 do not need to be applied to the first zone as the first zone has the abundance of the particular microbe. While in the first zone, the user interface 114 is used to set the second rotational speed of the second motor 44B to be zero so that the second type of dry granules 14 are not applied to the first zone. At the same time, the first rotational speed of the first motor 44A is set to be greater than zero so that the first type of dry granules 14 are applied to the first zone at the first predetermined rate.

Once the supply system 10 and the agricultural equipment 12 are in the second zone (having the lack of the particular microbe), both the first type and the second type of dry granules 14 are applied to the field. The second type of dry granules 14 do need to be applied to the second zone as the second zone has the lack of the particular microbe. While in the second zone, the user interface 114 is used to set the second rotational speed of the second motor 44B to be the greater than zero so that the second type of dry granules 14 are applied to the second zone at the second predetermined rate.

In some embodiments, the operator may adjust the rotational speed(s) of the motor(s) 44 using the user interface 114 based on a location of the agricultural equipment 12 within the field. In some embodiments, the processor 112 receives inputs, and the processor 112 controls the rotational speed(s) of the motor(s) 44 without requiring the operator to actively adjust the rotational speed(s) while the supply system 10 is in use. For example, the processor 112 may receive inputs from a Global Positioning System (GPS) regarding the position of the agricultural equipment 12 in the field and inputs from a soil testing system regarding the quality of soil in different zones of the field.

In some embodiments, the user interface 114 is coupled to the supply system 10, as shown in FIG. 1. In some embodiments, the user interface 114 is separate from the supply system 10. For example, the user interface 114 may be a mobile device or a tablet.

The supply system 10 further includes a housing 116 that defines an interior space 122, as shown in FIGS. 1, 2, and 4. The housing 116 includes a body 118 and a door 120 coupled with the body 118. The door 120 is coupled to the body 118 via a hinge connection 124, as shown in FIG. 2. The door 120, when open, allows for access to the interior space 122. When closed, the door 120 seals the interior space 122. In some embodiments, the user interface 114 is coupled to the body 118. In some embodiments, the user interface 114 is coupled to the door 120.

The storage unit 24 of the storage system 18 is arranged substantially outside of the interior space 122 of the housing 116. As shown in FIG. 2, the storage unit 24 extends through the housing 116 such that a portion of the storage unit 24 is located exterior to the housing 116 and another portion of the storage unit 24 is located inside of the housing 116. The portion of the storage unit 24 located exterior to the housing 116 is insulated, while the portion of the storage unit 24 located inside of the housing 116 is not insulated, which is shown through the different diameters of the storage unit 24 as the storage unit 24 extends downwardly into the housing 116.

The entirety of the metering system 20 is located inside of the housing 116, as shown in FIG. 2. The distribution system 22 is located partially inside of the housing 116 and partially outside of the housing 116, as shown in FIG. 2. More specifically, the horizontal portion 60 of the conduit 54 is located entirely inside of the housing 116, and the vertical portion 62 of the conduit 54 is located partially inside of the housing 116 and partially outside of the housing 116. The impeller unit 56 is located entirely exterior to the housing 116, and the plurality of outlet tubes 58 is located entirely exterior to the housing 116.

In some embodiments, the supply system 10 further includes a climate control system 126, as shown in FIGS. 3 and 4. The climate control system 126 is configured to regulate a temperature within the interior space 122 of the housing 116. The climate control system 126 may heat or cool the interior space 122. In some embodiments, the climate control system 126 is located within the interior space 122 of the housing 116. In some embodiments, the climate control system 126 is coupled with an inlet of the housing 116 and the climate control system 126 is located outside of the housing 116.

Some types of the dry granules 14 are temperature sensitive such that the dry granules 14 are kept at a target temperature throughout use and delivery. In some embodiments, the target temperature ranges from about 60 degrees to about 70 degrees Fahrenheit.

The control system 108 is communicatively coupled with the climate control system 126 to operate the climate control system 126, as shown in FIGS. 3 and 4. For example, the control system 108 allows the operator to turn the climate control system 126 on and off. The control system 108 allows the operator to set the climate control system 126 to the target temperature.

In some embodiments, the memory 110 of the control system 108 stores the target temperature of the dry granules 14 therein. In embodiments having more than one type of dry granules 14, the memory 110 stores the target temperature of each type of dry granules 14 therein.

In some embodiments, the supply system 10 includes one or more temperature sensors. The one or more temperature sensors monitor temperature throughout the supply system 10. The one or more temperature sensors are in communication with the control system 108 to send temperature data to the control system 108. For example, one temperature sensor may be coupled to an exterior of the housing 116 to monitor an external temperature. As another example, one temperature sensor may be located interior to the housing 116 to monitor the temperature within the interior space 122 of the housing 116. The processor 112 of the control system 108 may compare the monitored temperature within the interior space 122 to the target temperature of the dry granules 14. If the temperatures differ, then the control system 108 turns the climate control system 126 on or off such that the temperature within the interior space 122 matches the target temperature.

In some embodiments, the supply system 10 includes one or more pressure sensors. The one or more pressure sensors are in communication with the control system 108 to monitor pressures throughout the supply system 10. For example, the one or more pressure sensors may be located within the conduit 54, the impeller unit 56, the plurality of outlet tubes 58, and/or other locations within the supply system 10.

A size of the dry granules 14 may range from about one micron to about 1,000 microns. In some embodiments, the size of the dry granules 14 may range from about one micron to about 2,500 microns. In one example, the dry granules 14 may be applied to a field at a rate of about one to about two ounces per acre. In one example, the dry granules 14 may be applied to a field at a rate of about one to about five ounces per acre. In one example, the dry granules 14 may be applied to a field at a rate of about one to about seven ounces per acre. In one example, the dry granules 14 may be applied to a field at a rate of about five ounces per acre or less than about five ounces per acre. In one example, the dry granules 14 may be applied to a field at a rate of about four ounces per acre or less than about four ounces per acre. In one example, the dry granules 14 may be applied to a field at a rate of about three ounces per acre or less than about three ounces per acre. In one example, the dry granules 14 may be applied to a field at a rate of about two ounces per acre or less than about two ounces per acre. In one example, the dry granules 14 may be applied to a field at a rate of about one ounce per acre or less than about one ounce per acre. For a soybean field, for example, this may translate to the dry granules 14 being implanted into the soil of the field every about two to about three inches. Because the dry granules 14 are being implanted with the seed, less product (i.e., dry granules 14) are required as the delivery is in close proximity to the seed.

The following numbered clauses include embodiments that are contemplated and non-limiting:

Clause 1. A supply system for use with agricultural equipment, the supply system comprising a storage system.

Clause 2. The supply system of clause 1, any other suitable clause, or any combination of suitable clauses, wherein the storage system is configured to hold dry granules therein.

Clause 3. The supply system of clause 2, any other suitable clause, or any combination of suitable clauses, further comprising a metering system configured to meter the dry granules at a predetermined rate.

Clause 4. The supply system of clause 3, any other suitable clause, or any combination of suitable clauses, wherein the metering system includes a canister coupled with the storage system to receive the dry granules therefrom.

Clause 5. The supply system of clause 4, any other suitable clause, or any combination of suitable clauses, wherein the metering system includes a manifold coupled with the canister to direct the dry granules away from the canister.

Clause 6. The supply system of clause 5, any other suitable clause, or any combination of suitable clauses, wherein the metering system includes a metering screw arranged in the manifold and configured to rotate about a screw axis to selectively control the predetermined rate of the dry granules entering the manifold from the canister.

Clause 7. The supply system of clause 6, any other suitable clause, or any combination of suitable clauses, further comprising a distribution system.

Clause 8. The supply system of clause 7, any other suitable clause, or any combination of suitable clauses, wherein the distribution system includes a conduit coupled with the manifold to receive the dry granules therefrom and to transport the dry granules away from the manifold.

Clause 9. The supply system of clause 8, any other suitable clause, or any combination of suitable clauses, wherein the distribution system includes a plurality of outlet tubes in fluid communication with the conduit to direct the dry granules toward a receiver unit at the predetermined rate.

Clause 10. The supply system of clause 9, any other suitable clause, or any combination of suitable clauses, wherein the dry granules are biological dry granules.

Clause 11. The supply system of clause 9, any other suitable clause, or any combination of suitable clauses, wherein the dry granules are non-biological dry granules.

Clause 12. The supply system of clause 9, any other suitable clause, or any combination of suitable clauses, wherein the metering system further includes a motor configured to drive rotation of the metering screw about the screw axis.

Clause 13. The supply system of clause 12, any other suitable clause, or any combination of suitable clauses, wherein the motor is a variable speed motor.

Clause 14. The supply system of clause 12, any other suitable clause, or any combination of suitable clauses, wherein the manifold of the metering system includes an inlet coupled with the canister and an outlet coupled with the conduit of the distribution system.

Clause 15. The supply system of clause 14, any other suitable clause, or any combination of suitable clauses, wherein the metering screw is located within the manifold between the inlet and the outlet.

Clause 16. The supply system of clause 15, any other suitable clause, or any combination of suitable clauses, wherein the metering system further includes an agitator arranged in the canister and configured to rotate about an agitator axis to agitate the dry granules therein.

Clause 17. The supply system of clause 16, any other suitable clause, or any combination of suitable clauses, wherein the agitator axis is perpendicular to the screw axis.

Clause 18. The supply system of clause 14, any other suitable clause, or any combination of suitable clauses, wherein the conduit includes a horizontal portion extending between a first end and a second end thereof and a vertical portion extending between a first end and a second end thereof, and wherein the outlet of the manifold of the metering system is coupled to the horizontal portion between the first end and second end thereof and the first end of the vertical portion is coupled with the second end of the horizontal portion to extend upwardly therefrom.

Clause 19. The supply system of clause 18, any other suitable clause, or any combination of suitable clauses, wherein the distribution system further includes an air supply unit coupled to the first end of the horizontal portion of the conduit and configured to direct pressurized air through the conduit to carry the dry granules through the conduit.

Clause 20. The supply system of clause 19 any other suitable clause, or any combination of suitable clauses, wherein the air supply unit includes a blower and a motor configured to power the blower.

Clause 21. The supply system of clause 19, any other suitable clause, or any combination of suitable clauses, wherein the air supply unit receives the pressurized air from the agricultural equipment.

Clause 22. The supply system of clause 18, any other suitable clause, or any combination of suitable clauses, wherein the first end of the horizontal portion of the conduit is coupled to an air intake to receive pressurized air configured to carry the dry granules through the conduit.

Clause 23. The supply system of clause 18, any other suitable clause, or any combination of suitable clauses, wherein the first end of the horizontal portion of the conduit is configured to receive pressurized air from the agricultural equipment to carry the dry granules through the conduit.

Clause 24. The supply system of clause 18, any other suitable clause, or any combination of suitable clauses, wherein the distribution system further includes an impeller unit coupled to the second end of the vertical portion of the conduit and configured to direct the dry granules into the plurality of outlet tubes.

Clause 25. The supply system of clause 24, any other suitable clause, or any combination of suitable clauses, wherein the distribution system further includes an air supply unit coupled to the first end of the horizontal portion of the conduit and configured to direct pressurized air through the conduit to carry the dry granules through the conduit and into the impeller unit.

Clause 26. The supply system of clause 25, any other suitable clause, or any combination of suitable clauses, wherein the impeller unit includes an impeller that rotates about an impeller axis and a body configured to receive the impeller therein, and wherein the impeller is driven to rotate about the impeller axis by the pressurized air from the air supply unit.

Clause 27. The supply system of clause 26, any other suitable clause, or any combination of suitable clauses, wherein the impeller unit further includes a plurality of nozzles coupled to the body circumferentially about the impeller axis, and wherein each of the plurality of nozzles is coupled to a respective one of the plurality of outlet tubes.

Clause 28. The supply system of clause 9, any other suitable clause, or any combination of suitable clauses, wherein the metering system further includes an agitator arranged in the canister and configured to rotate about an agitator axis to agitate the dry granules therein.

Clause 29. The supply system of clause 9, any other suitable clause, or any combination of suitable clauses, wherein the manifold of the metering system includes an inlet coupled with the canister and an outlet coupled with the conduit of the distribution system.

Clause 30. The supply system of clause 29, any other suitable clause, or any combination of suitable clauses, wherein the metering screw is located within the manifold between the inlet and the outlet.

Clause 31. The supply system of clause 9, any other suitable clause, or any combination of suitable clauses, wherein the conduit includes a horizontal portion extending between a first end and a second end thereof and a vertical portion extending between a first end and a second end thereof, and wherein the manifold of the metering system is coupled to the horizontal portion between the first end and second end thereof and the first end of the vertical portion is coupled with the second end of the horizontal portion to extend upwardly therefrom.

Clause 32. The supply system of clause 9, any other suitable clause, or any combination of suitable clauses, wherein the distribution system further includes an air supply unit coupled to the conduit and configured to direct pressurized air through the conduit to carry the dry granules through the conduit toward the plurality of outlet tubes.

Clause 33. The supply system of clause 32, any other suitable clause, or any combination of suitable clauses, wherein the air supply unit includes a blower and a motor configured to power the blower.

Clause 34. The supply system of clause 32, any other suitable clause, or any combination of suitable clauses, wherein the air supply unit receives the pressurized air from the agricultural equipment.

Clause 35. The supply system of clause 9, any other suitable clause, or any combination of suitable clauses, wherein the conduit is coupled to an air intake to receive pressurized air configured to carry the dry granules through the conduit toward the plurality of outlet tubes.

Clause 36. The supply system of clause 9, any other suitable clause, or any combination of suitable clauses, wherein the distribution system further includes an impeller unit coupled to the conduit and configured to direct the dry granules into the plurality of outlet tubes.

Clause 37. The supply system of clause 36, any other suitable clause, or any combination of suitable clauses, wherein the distribution system further includes an air supply unit coupled to the conduit opposite the impeller unit and configured to direct pressurized air through the conduit to carry the dry granules through the conduit to the impeller unit.

Clause 38. The supply system of clause 37, any other suitable clause, or any combination of suitable clauses, wherein the impeller unit includes an impeller that rotates about an impeller axis and a body configured to receive the impeller therein, and wherein the impeller is driven to rotate about the impeller axis by the pressurized air from the air supply unit.

Clause 39. The supply system of clause 38, any other suitable clause, or any combination of suitable clauses, wherein each of the plurality of outlet tubes is coupled with the body of the impeller unit in spaced apart relation to one another circumferentially about the body relative to the impeller axis.

Clause 40. The supply system of clause 9, any other suitable clause, or any combination of suitable clauses, further comprising a housing shaped to define an interior space therein, and wherein the metering system is located entirely within the interior space of the housing.

Clause 41. The supply system of clause 40, any other suitable clause, or any combination of suitable clauses, wherein the storage system is at least partially located exterior to the housing.

Clause 42. The supply system of clause 41, any other suitable clause, or any combination of suitable clauses, wherein the conduit of the distribution system is at least partially located within the interior space of the housing, and wherein the plurality of outlet tubes are located entirely outside of the housing.

Clause 43. The supply system of clause 40, any other suitable clause, or any combination of suitable clauses, further comprising a climate control system configured to regulate a temperature within the interior space of the housing.

Clause 44. The supply system of clause 43, any other suitable clause, or any combination of suitable clauses, wherein the climate control system is located within the interior space of the housing.

Clause 45. The supply system of clause 40, any other suitable clause, or any combination of suitable clauses, wherein the climate control system is coupled with an inlet of the housing and the climate control system is located outside of the housing.

Clause 46. The supply system of clause 9, any other suitable clause, or any combination of suitable clauses, further comprising a control system communicatively coupled with the metering system and configured to vary a rotational speed of the metering screw about the screw axis to selectively control the predetermined rate of the dry granules entering the manifold from the canister.

Clause 47. The supply system of clause 9, any other suitable clause, or any combination of suitable clauses, wherein the storage system includes a first storage unit and a second storage unit, and the dry granules include a first type of dry granules located in the first storage unit and a second type of dry granules different than the first type of dry granules located in the second storage unit.

Clause 48. The supply system of clause 47, any other suitable clause, or any combination of suitable clauses, wherein the canister of the metering system is a first canister coupled with the first storage unit, the metering screw of the metering system is a first metering screw, and the predetermined rate is a first predetermined rate of the first type of dry granules entering the manifold from the first canister, and wherein the supply system further comprises a second canister coupled with the second storage unit and a second metering screw arranged in the manifold and configured to rotate about the screw axis to selectively control a second predetermined rate of the second type of dry granules entering the manifold from the second canister.

Clause 49. The supply system of clause 48, any other suitable clause, or any combination of suitable clauses, wherein the metering system includes a first motor configured to drive rotation of the first metering screw and a second motor configured to drive rotation of the second metering screw.

Clause 50. The supply system of clause 49, any other suitable clause, or any combination of suitable clauses, further comprising a control system communicatively coupled with the first motor and the second motor and configured to vary a rotational speed of both of the first motor and the second motor independent of one another to adjust a rotational speed of the first metering screw and the second metering screw, respectively, in order to selectively control the first predetermined rate of the first type of dry granules entering the manifold and the second predetermined rate of the second type of dry granules entering the manifold.

Clause 51. The supply system of clause 50, any other suitable clause, or any combination of suitable clauses, wherein the first predetermined rate is different than the second predetermined rate.

Clause 52. The supply system of clause 48, any other suitable clause, or any combination of suitable clauses, wherein the manifold of the metering system includes a first inlet coupled with the first canister, a second inlet horizontally spaced apart from the first inlet and coupled with the second canister, and an outlet coupled with the conduit of the distribution system to direct the first type of dry granules and the second type of dry granules into the conduit from the metering system.

Clause 53. The supply system of clause 47, any other suitable clause, or any combination of suitable clauses, wherein the first type of dry granules comprise biological dry granules and the second type of dry granules comprise non-biological dry granules.

Clause 54. The supply system of clause 9, any other suitable clause, or any combination of suitable clauses, wherein the receiver unit is a row unit of a planter.

Clause 55. The supply system of clause 9, any other suitable clause, or any combination of suitable clauses, wherein the receiver unit is a liquid intake.

Clause 56. The supply system of clause 9, any other suitable clause, or any combination of suitable clauses, wherein the receiver unit is a seed distribution line.

Clause 57. The supply system of clause 9, any other suitable clause, or any combination of suitable clauses, wherein the agricultural equipment is stationary.

Clause 58. The supply system of clause 9, any other suitable clause, or any combination of suitable clauses, wherein the agricultural equipment is non-stationary.

Clause 59. A method of metering dry granules from a supply system, the method comprising storing dry granules in a storage system.

Clause 60. The method of clause 59, any other suitable clause, or any combination of suitable clauses, further comprising directing the dry granules from the storage system to a canister of a metering system.

Clause 61. The method of clause 60, any other suitable clause, or any combination of suitable clauses, further comprising rotating a metering screw of the metering system at a first rotational speed.

Clause 62. The method of clause 61, any other suitable clause, or any combination of suitable clauses, further comprising metering the dry granules from the canister to a conduit of a distribution system at a first predetermined rate in response to rotation of the metering screw at the first rotational speed.

Clause 63. The method of clause 62, any other suitable clause, or any combination of suitable clauses, further comprising directing the dry granules through the conduit and into an impeller unit via pressurized air.

Clause 64. The method of clause 62, any other suitable clause, or any combination of suitable clauses, further comprising directing the dry granules through the conduit and into an impeller unit via vacuumed air.

Clause 65. The method of clause 63, any other suitable clause, or any combination of suitable clauses, further comprising rotating an impeller of the impeller unit via the pressurized air.

Clause 66. The method of clause 64, any other suitable clause, or any combination of suitable clauses, further comprising rotating an impeller of the impeller unit via the vacuumed air.

Clause 67. The method of clause 65, any other suitable clause, or any combination of suitable clauses, further comprising directing the dry granules into a plurality of outlet tubes in response to rotation of the impeller.

Clause 68. The method of clause 67, any other suitable clause, or any combination of suitable clauses, further comprising applying the dry granules to a receiver unit from the plurality of outlet tubes at the first predetermined rate.

Clause 69. The method of clause 68, any other suitable clause, or any combination of suitable clauses, further comprising powering a motor to drive the metering screw at the first rotational speed.

Clause 70. The method of clause 69, any other suitable clause, or any combination of suitable clauses, wherein the motor is a variable speed motor.

Clause 71. The method of clause 68, any other suitable clause, or any combination of suitable clauses, further comprising adjusting a speed of the metering screw so that the metering screw rotates at a second rotational speed different than the first rotational speed.

Clause 72. The method of clause 71, any other suitable clause, or any combination of suitable clauses, further comprising, in response to adjusting the speed of the metering screw to the second rotational speed, metering the dry granules from the canister to the conduit of the distribution system at a second predetermined rate different than the first predetermined rate.

Clause 73. The method of clause 68, any other suitable clause, or any combination of suitable clauses, further comprising rotating an agitator located within the canister to agitate the dry granules therein.

Clause 74. The method of clause 68, any other suitable clause, or any combination of suitable clauses, further comprising pressurizing ambient air to form the pressurized air and directing the pressurized air through the conduit so that the dry granules within the conduit are directed through the conduit therewith toward the impeller unit.

Clause 75. The method of clause 68, any other suitable clause, or any combination of suitable clauses, further comprising vacuuming ambient air to form the vacuumed air and directing the vacuumed air through the conduit so that the dry granules within the conduit are directed through the conduit therewith toward the impeller unit.

Clause 76. The method of clause 74, any other suitable clause, or any combination of suitable clauses, wherein the pressurized air and the dry granules are directed horizontally through the conduit and then vertically upwardly through the conduit to the impeller unit.

Clause 77. The method of clause 75, any other suitable clause, or any combination of suitable clauses, wherein the vacuumed air and the dry granules are directed horizontally through the conduit and then vertically upwardly through the conduit to the impeller unit.

Clause 78. The method of clause 68, any other suitable clause, or any combination of suitable clauses, further comprising monitoring a temperature within a housing of the supply system.

Clause 79. The method of clause 78, any other suitable clause, or any combination of suitable clauses, further comprising comparing the monitored temperature within the housing of the supply system to a target temperature, the target temperature based, at least in part, on a type of the dry granules.

Clause 80. The method of clause 79, any other suitable clause, or any combination of suitable clauses, further comprising, in response to the monitored temperature being different than the target temperature, regulating the temperature within a housing of the supply system.

Clause 81. The method of clause 68, any other suitable clause, or any combination of suitable clauses, wherein the storage system includes a first storage unit and a second storage unit, and wherein the step of storing dry granules in a storage system includes storing a first type of dry granules in the first storage unit and storing a second type of dry granules different than the first type of dry granules in the second storage unit.

Clause 82. The method of clause 81, any other suitable clause, or any combination of suitable clauses, wherein the canister is a first canister coupled with the first storage unit and the metering system includes a second canister coupled with the second storage unit, and wherein the step of directing the dry granules from the storage system to a canister of a metering system includes directing the first type of dry granules from the first storage unit to the first canister and directing the second type of dry granules from the second storage unit to the second canister.

Clause 83. The method of clause 82, any other suitable clause, or any combination of suitable clauses, wherein the metering screw is a first metering screw, and wherein the method further comprises rotating a second metering screw of the metering system at a second rotational speed.

Clause 84. The method of clause 83, any other suitable clause, or any combination of suitable clauses, further comprising metering the second type of dry granules from the second canister to the conduit at a second predetermined rate in response to rotation of the second metering screw at the second rotational speed.

Clause 85. The method of clause 84, any other suitable clause, or any combination of suitable clauses, wherein the first predetermined rate is different than the second predetermined rate.

Clause 86. The method of clause 84, any other suitable clause, or any combination of suitable clauses, further comprising stopping rotation of the second metering screw in response to the supply system moving from a first zone of a field to a second zone of the field and maintaining rotation of the first metering screw at the first rotational speed.

Clause 87. The method of clause 68, any other suitable clause, or any combination of suitable clauses, wherein the dry granules are biological dry granules.

Clause 88. The method of clause 68, any other suitable clause, or any combination of suitable clauses, wherein the dry granules are non-biological dry granules.

Clause 89. A method of metering dry granules from a supply system, the method comprising storing a first type of dry granules in a first storage unit and storing a second type of dry granules in a second storage unit.

Clause 90. The method of clause 89, any other suitable clause, or any combination of suitable clauses, further comprising directing the first type of dry granules from the first storage unit to a first canister of a metering system and directing the second type of dry granules from the second storage unit to a second canister of the metering system.

Clause 91. The method of clause 90, any other suitable clause, or any combination of suitable clauses, further comprising rotating a first metering screw of the metering system at a first rotational speed.

Clause 92. The method of clause 91, any other suitable clause, or any combination of suitable clauses, further comprising metering the first type of dry granules from the first canister to a conduit of a distribution system at a first predetermined rate in response to rotation of the first metering screw at the first rotational speed.

Clause 93. The method of clause 92, any other suitable clause, or any combination of suitable clauses, further comprising rotating a second metering screw of the metering system at a second rotational speed.

Clause 94. The method of clause 93, any other suitable clause, or any combination of suitable clauses, further comprising metering the second type of dry granules from the second canister to the conduit at a second predetermined rate in response to rotation of the second metering screw at the second rotational speed.

Clause 95. The method of clause 94, any other suitable clause, or any combination of suitable clauses, further comprising directing the first and second types of dry granules through the conduit and into an impeller unit via pressurized air.

Clause 96. The method of clause 95, any other suitable clause, or any combination of suitable clauses, further comprising rotating an impeller of the impeller unit via the pressurized air.

Clause 97. The method of clause 96, any other suitable clause, or any combination of suitable clauses, further comprising directing the first and second types of dry granules into a plurality of outlet tubes in response to rotation of the impeller.

Clause 98. The method of clause 97, any other suitable clause, or any combination of suitable clauses, further comprising applying the first and second types of dry granules to a receiver unit from the plurality of outlet tubes at the first predetermined rate and the second predetermined rate, respectively.

Clause 99. The method of clause 98, any other suitable clause, or any combination of suitable clauses, further comprising powering a first motor to drive the first metering screw at the first rotational speed and powering a second motor to drive the second metering screw at the second rotational speed.

Clause 100. The method of clause 98, any other suitable clause, or any combination of suitable clauses, further comprising adjusting a speed of the first metering screw so that the first metering screw rotates at a third rotational speed different than the first rotational speed.

Clause 101. The method of clause 100, any other suitable clause, or any combination of suitable clauses, further comprising, in response to adjusting the speed of the first metering screw to the third rotational speed, metering the first type of dry granules from the first canister to the conduit of the distribution system at a third predetermined rate different than the first predetermined rate.

Clause 102. The method of clause 98, any other suitable clause, or any combination of suitable clauses, further comprising rotating a first agitator located within the first canister to agitate the first type of dry granules therein and rotating a second agitator located within the second canister to agitate the second type of dry granules therein.

Clause 103. The method of clause 98, any other suitable clause, or any combination of suitable clauses, further comprising pressurizing ambient air to form the pressurized air and directing the pressurized air through the conduit so that the first and second types of dry granules within the conduit are directed through the conduit therewith toward the impeller unit.

Clause 104. The method of clause 98, any other suitable clause, or any combination of suitable clauses, wherein second type of dry granules are different than the first type of dry granules.

Clause 105. The method of clause 98, any other suitable clause, or any combination of suitable clauses, wherein the first predetermined rate is different than the second predetermined rate.

Clause 106. The method of clause 98, any other suitable clause, or any combination of suitable clauses, further comprising stopping rotation of the second metering screw in response to the supply system moving from a first zone of a field to a second zone of the field and maintaining rotation of the first metering screw at the first rotational speed.

The invention claimed is:

1. A supply system for use with agricultural equipment, the supply system comprising a storage system configured to hold dry granules therein, a metering system configured to meter the dry granules at a predetermined rate, the metering system including a canister coupled with the storage system to receive the dry granules therefrom, a manifold coupled with the canister to direct the dry granules away from the canister, and a metering screw arranged in the manifold and configured to rotate about a screw axis to selectively control the predetermined rate of the dry granules entering the manifold from the canister, and a distribution system including a conduit coupled with the manifold to receive the dry granules therefrom and to transport the dry granules away from the manifold and a plurality of outlet tubes in fluid communication with the conduit to direct the dry granules toward a receiver unit at the predetermined rate.

2. The supply system of claim 1, wherein the metering system further includes a motor configured to drive rotation of the metering screw about the screw axis.

3. The supply system of claim 1, wherein the manifold of the metering system includes an inlet coupled with the canister and an outlet coupled with the conduit of the distribution system, and wherein the metering screw is located within the manifold between the inlet and the outlet.

4. The supply system of claim 3, wherein the metering system further includes an agitator arranged in the canister and configured to rotate about an agitator axis to agitate the dry granules therein.

5. The supply system of claim 3, wherein the conduit includes a horizontal portion extending between a first end and a second end thereof and a vertical portion extending between a first end and a second end thereof, and wherein the outlet of the manifold of the metering system is coupled to the horizontal portion between the first end and second end thereof and the first end of the vertical portion is coupled with the second end of the horizontal portion to extend upwardly therefrom.

6. The supply system of claim 5, wherein the distribution system further includes an air supply unit coupled to the first end of the horizontal portion of the conduit and configured to direct pressurized air through the conduit to carry the dry granules through the conduit.

7. The supply system of claim 6, wherein the distribution system further includes an impeller unit coupled to the second end of the vertical portion of the conduit and configured to direct the dry granules into the plurality of outlet tubes, and wherein the impeller unit includes an impeller that rotates about an impeller axis and a body configured to receive the impeller therein, and the impeller is driven to rotate about the impeller axis by the pressurized air from the air supply unit.

8. The supply system of claim 7, wherein the impeller unit further includes a plurality of nozzles coupled to the body circumferentially about the impeller axis, and wherein each of the plurality of nozzles is coupled to a respective one of the plurality of outlet tubes.

9. The supply system of claim 1, further comprising a housing shaped to define an interior space therein, and wherein the metering system is located entirely within the interior space of the housing, the conduit of the distribution system is at least partially located within the interior space of the housing, and the plurality of outlet tubes are located entirely outside of the housing.

10. The supply system of claim 1, wherein the storage system includes a first storage unit and a second storage unit, and the dry granules include a first type of dry granules located in the first storage unit and a second type of dry granules different than the first type of dry granules located in the second storage unit, and wherein the canister of the metering system is a first canister coupled with the first storage unit, the metering screw of the metering system is a first metering screw, and the predetermined rate is a first predetermined rate of the first type of dry granules entering the manifold from the first canister, and wherein the supply system further comprises a second canister coupled with the second storage unit and a second metering screw arranged in the manifold and configured to rotate about the screw axis to selectively control a second predetermined rate of the second type of dry granules entering the manifold from the second canister.

* * * * *